(12) United States Patent
Mori et al.

(10) Patent No.: US 8,557,377 B2
(45) Date of Patent: Oct. 15, 2013

(54) PHOTOCHROMIC OPTICAL ELEMENT

(75) Inventors: Katsuhiro Mori, Shunan (JP); Yuichiro Kawabata, Shunan (JP); Ikumi Kawaguchi, Shunan (JP); Hironobu Nagoh, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 1186 days.

(21) Appl. No.: 12/223,116

(22) PCT Filed: Jan. 19, 2007

(86) PCT No.: PCT/JP2007/050777
§ 371 (c)(1),
(2), (4) Date: Jul. 23, 2008

(87) PCT Pub. No.: WO2007/086320
PCT Pub. Date: Aug. 2, 2007

(65) Prior Publication Data
US 2010/0233485 A1 Sep. 16, 2010

(30) Foreign Application Priority Data

Jan. 24, 2006 (JP) .................... 2006-015056
May 19, 2006 (JP) .................... 2006-140647

(51) Int. Cl.
*B32B 9/04* (2006.01)
*G02B 1/10* (2006.01)
*B05D 5/06* (2006.01)

(52) U.S. Cl.
USPC ........... 428/328; 427/162; 427/164; 427/165; 428/329; 428/331; 428/334; 428/335; 428/336; 428/447; 428/451

(58) Field of Classification Search
USPC ......... 428/451, 328, 329, 331, 334, 335, 336, 428/447; 427/162, 164, 165
See application file for complete search history.

(56) References Cited

U.S. PATENT DOCUMENTS

| 5,725,960 | A | * | 3/1998 | Konishi et al. ............... 428/451 |
| 5,914,193 | A | | 6/1999 | Ono et al. |
| 6,858,305 | B2 | * | 2/2005 | Degand et al. ............. 428/423.1 |
| 7,951,445 | B2 | * | 5/2011 | Izumi et al. ................... 428/212 |
| 7,981,506 | B2 | * | 7/2011 | Naito et al. ................... 428/328 |
| 2001/0049023 | A1 | * | 12/2001 | Havey et al. ................. 428/429 |
| 2008/0067701 | A1 | * | 3/2008 | Ford et al. ...................... 264/1.1 |

FOREIGN PATENT DOCUMENTS

| EP | 1 612 042 A1 | 1/2006 |
| JP | 8-157467 A | 6/1996 |
| JP | 8-176139 A | 7/1996 |
| JP | 8-295690 A | 11/1996 |

(Continued)

*Primary Examiner* — D. S. Nakarani
(74) *Attorney, Agent, or Firm* — Birch, Stewart, Kolasch & Birch, LLP

(57) ABSTRACT

A photochromic optical element comprising an optical substrate, a photochromic coat layer, and a hard coat layer that are laminated in this order, wherein (I) the photochromic coat layer comprising an alkylamino group-containing photochromic compound and/or a dialkylamino group-containing photochromic compound in a total amount of 0.1 to 10.0% by mass, and (II) the hard coat layer is obtained by curing a hard coat agent comprising metal oxide fine particles and an organosilicon compound, the hard coat agent containing as the organosilicon compound at least one selected from the group consisting of a tetraalkoxy silane, a methyl trialkoxy silane, and partial hydrolysates thereof in an amount of 10 to 60% by mass based on the total mass of the metal oxide fine particles and the organosilicon compound.

14 Claims, 1 Drawing Sheet

(56) References Cited

FOREIGN PATENT DOCUMENTS

| | | |
|---|---|---|
| JP | 9-124645 A | 5/1997 |
| JP | 9-218301 A | 8/1997 |
| JP | 9-269402 A | 10/1997 |
| JP | 10-10301 A | 1/1998 |
| JP | 10-298176 A | 11/1998 |
| JP | 11-279171 A | 10/1999 |
| JP | 11-286484 A | 10/1999 |
| JP | 11-322739 A | 11/1999 |
| JP | 2000-219678 A | 8/2000 |
| JP | 2000-219685 A | 8/2000 |
| JP | 2000-219686 A | 8/2000 |
| JP | 2000-229972 A | 8/2000 |
| JP | 2000-229973 A | 8/2000 |
| JP | 2000-229974 A | 8/2000 |
| JP | 2000-229975 A | 8/2000 |
| JP | 2000-229976 A | 8/2000 |
| JP | 2000-256347 A | 9/2000 |
| JP | 2000-327675 A | 11/2000 |
| JP | 2000-327676 A | 11/2000 |
| JP | 2000-344761 A | 12/2000 |
| JP | 2000-344762 A | 12/2000 |
| JP | 2000-347346 A | 12/2000 |
| JP | 2001-11066 A | 1/2001 |
| JP | 2001-11067 A | 1/2001 |
| JP | 2001-31670 A | 2/2001 |
| JP | 2001-114775 A | 4/2001 |
| JP | 2003-128713 A | 5/2003 |
| JP | 2003-342310 A | 12/2003 |
| JP | 2004-295114 A | 10/2004 |
| JP | 2005-23238 A | 1/2005 |
| WO | WO-03/011967 A1 | 2/2003 |
| WO | WO-03/058300 A1 | 7/2003 |
| WO | WO-2004/078476 A1 | 9/2004 |
| WO | WO 2005/091055 * | 9/2005 |

* cited by examiner

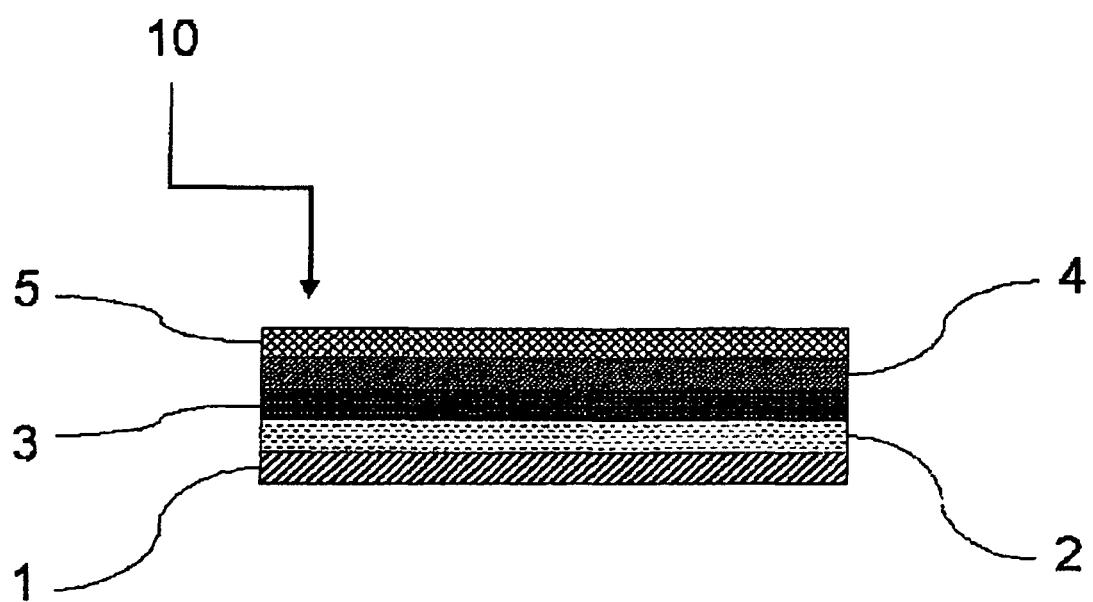

PHOTOCHROMIC OPTICAL ELEMENT

TECHNICAL FIELD

The present invention relates to a photochromic optical element wherein on the surface of an optical substrate a photochromic coat layer and a hard coat layer are formed in this order. More specifically, it relates to an optical element in which a hard coat layer is formed on a photochromic coat layer containing a (di)alkylamino group-containing photochromic compound, and the photochromic compound does not change its nature and is not discolored to reddish.

BACKGROUND ART

Photochromic glasses function as sun glasses by prompt color development outdoors where a light containing ultraviolet light such as sunlight is applied to the glasses and function as ordinary transparent glasses by color fading indoors where no such light is applied to the glasses. The demand for the photochromic glasses is growing in recent years.

As a method for manufacturing plastic lenses having photochromic properties, there have been known a method in which a photochromic compound is allowed to impregnate the surface of a lens having no photochromic properties (impregnation method); a method in which a photochromic compound is dissolved into a monomer, and the monomer is polymerized to directly give a photochromic lens (kneading or in-mass method); and a method in which a layer having photochromic properties (hereinafter sometimes referred to as the photochromic coat layer) is formed on the surface of a plastic lens by using a coating liquid containing a photochromic compound (hereinafter sometimes referred to as the photochromic coating agent) (coating method). Among them, the coating method has a merit that, in principle, the photochromic properties can be imparted easily to any lens substrates as compared with the other two methods. For instance, in the impregnation method, it is necessary to use a soft lens substrate as the substrate lens so that a photochromic compound may easily diffuse into it. Further in the kneading or in-mass method, a special monomer composition needs to be used in order to realize good photochromic properties. In contrast, in the coating method, there are no such restrictions in the substrates.

When a photochromic plastic lens is manufactured by the coating method, the thickness of a photochromic coat layer formed on the surface of a lens substrate is thin. Therefore, in order to obtain a photochromic coat layer having practical color optical density, the coat layer needs to contain a photochromic compound in a high concentration. As such photochromic compounds, chromene derivatives are widely used, and especially from the viewpoints of excellent color development and rapid fade rate, alkylamino group-containing or dialkylamino group-containing chromene derivatives are sometimes used (refer to Patent Documents 1 and 2).

In addition, on the photochromic coat layer, a hard coat layer is formed in order to improve scratch resistance of the optical substrate. For instance, in the Patent Document 1, an example using a hard coat agent 1 (trade name TS56H, manufactured by Tokuyama Corp.) is described. In the Patent Document 1, when a hard coat layer is formed on a photochromic coat layer, a hard coat liquid not containing a tetraalkoxy silane nor a methyl trialkoxy silane is used because of the pot-life problem of the hard coat agent (a storage period for which the hard coat agent keeps physical properties to realize expected effects after preparation of the hard coat agent is short).

Patent Document 1: WO 2003/011967
Patent Document 2: Japanese Patent Application Laid-Open

DISCLOSURE OF THE INVENTION

Problems to be Solved by the Invention

However, in the case that the hard coat layer is formed on the photochromic coat layer containing an alkylamino group-containing photochromic compound or a dialkylamino group-containing photochromic compound in high concentration, the coated lens may have a slightly reddish color when light is not applied, and expected color tones may not be realized and the redness may exceed an allowable level at the time of color development even though the color tones are pre-designed. Accordingly, an object of the present invention is to prevent these problems that the color tones differ from pre-designed color tones at the time of color development and fading; and the redness is developed when the hard coat layer is formed on the photochromic coat layer containing an alkylamino group-containing photochromic compound or a dialkylamino group-containing photochromic compound in high concentration.

The present inventors have investigated thoroughly the causes of these problems, although not particularly tied up to a theory, it is assumed as their cause that a part of the photochromic compound in the photochromic coat layer migrates to the hard coat layer, then metal oxide fine particles, a curing catalyst and the like contained in the hard coat layer interact with the alkylamino group or the dialkylamino group in the photochromic compound, and thus an emission spectrum of the photochromic compound by light irradiation changes greatly.

In order to inhibit the redness, it will be effective to eliminate or reduce the metal oxide fine particles and the curing catalyst in the hard coat layer. However, this approach is not realistic because it is difficult to obtain hard coat layers having sufficient strength.

Accordingly, the present inventors have carried out the investigation from the viewpoint of preventing the migration of the photochromic compound to the hard coat layer, and have accomplished the present invention as described below.

Means for Solving the Problems

Means for solving the problems provided by the present invention are as follows.

(1) A photochromic optical element comprising an optical substrate, a photochromic coat layer, and a hard coat layer that are laminated in this order, wherein (I) the photochromic coat layer comprises an alkylamino group-containing photochromic compound and/or a dialkylamino group-containing photochromic compound in a total amount of 0.1 to 10.0% by mass, and (II) the hard coat layer is obtained by curing a hard coat agent comprising metal oxide fine particles and an organosilicon compound, and the hard coat agent containing as the organosilicon compound at least one selected from the group consisting of a tetraalkoxy silane, a methyl trialkoxy silane, and partial hydrolysates thereof in an amount of 10 to 60% by mass as expressed by % mass based on the total mass of the metal oxide fine particles and the organosilicon compound (with the proviso that when the organosilicon compound is a partial hydrolysate of a partially hydrolyzable organosilicon compound, the mass of the organosilicon compound in the above total mass is the mass of the partially hydrolyzable organosilicon compound).

(2) The photochromic optical element according to the (1), wherein the hard coat agent for the hard coat layer further comprises an epoxy-containing silicon compound and/or a partial hydrolysate thereof, and a curing catalyst.

(3) The photochromic optical element according to the (2), wherein the hard coat agent for the hard coat layer contains an acetylacetonate complex as the curing catalyst.

(4) The photochromic optical element according to the (3), wherein the hard coat agent for the hard coat layer further comprises a quaternary ammonium salt and/or a quaternary phosphonium salt.

(5) A method for producing a photochromic optical element in which an optical substrate, a photochromic coat layer, and a hard coat layer are laminated in this order, comprising the steps of; applying a hard coat agent comprising metal oxide fine particles and an organosilicon compound on the photochromic coat layer which is laminated on the optical substrate, and curing the hard coat agent to form the hard coat layer; wherein the hard coat agent contains as the organosilicon compound at least one selected from the group consisting of a tetraalkoxy silane, a methyl trialkoxy silane, and partial hydrolysates thereof in an amount of 10 to 60% by mass based on the total mass of the metal oxide fine particles and the organosilicon compound (with the proviso that when the organosilicon compound is a partial hydrolysate of a partially hydrolyzable organosilicon compound, the mass of the organosilicon compound in the above total mass is the mass of the partially hydrolyzable organosilicon compound).

Effects of the Invention

The present invention can provide the photochromic optical element obtained by a coating method in which the photochromic coat layer contains an alkylamino group-containing photochromic compound and/or a dialkylamino group-containing photochromic compound having excellent photochromic properties in high concentration. According to the element, the redness does not occur at the time of no light irradiation and the color tones do not change at the time of color development (the color tones do not differ from the expected color tones) even when the hard coat layer is formed on the photochromic coat layer.

The element mentioned in the embodiment (4) comprises the hard coat layer formed by using the hard coat agent containing a quaternary ammonium salt and/or a quaternary phosphonium salt further has the following characteristics. When hard coat layers are formed on photochromic coat layers or the backsides of lens substrates, in general, the base layers are chemically or physically etched as a pre-treatment in order to improve adhesion of the hard coat layers. In the case of the optical element according to the embodiment (4), the chemical etching with an aqueous alkaline solution can be carried out as the pre-treatment. Because the chemical etching with an aqueous alkaline solution is simple, does not need special equipment and can double as washing of the lens substrate, the embodiment provides advantages in terms of the production yield and cost.

BRIEF DESCRIPTION OF THE DRAWING

Drawing 1

The drawing is a cross-section diagram illustrating a representative embodiment for the photochromic optical element of the present invention.

EXPLANATION OF THE CODES

1: Optical substrate
2: Primer layer
3: Photochromic coat layer
4: Hard coat layer
5: Antireflection layer
10: Photochromic optical element

BEST MODE FOR CARRYING OUT THE INVENTION

In the following, embodiments of the present invention will be described to be more precise with reference to the drawing.

As shown in Drawing 1, in a photochromic optical element 10 of the present invention, an optical substrate 1, a photochromic coat layer 3, and a hard coat layer 4 are laminated in this order. Between the optical substrate 1 and the photochromic coat layer 3, a primer layer 2 may be formed in order to improve the adhesion of the photochromic coat layer 3 with the optical substrate 1. Also, an antireflection layer 5 may be further formed on the hard coat layer 4. Here, the antireflection layer 5 is usually a laminate of plural inorganic thin film layers having different refractive indexes, though the layer is simplified in the Drawing 1. Also, though not shown in the Drawing, the hard coat layer 4 and the antireflection layer 5 may be formed on the backside of the optical substrate 1. Further, though not shown in the Drawing, an impact-resistant primer layer may be formed between the photochromic coat layer 3 and the hard coat layer 4 or between the backside of the optical substrate 1 and the hard coat layer 4 in order to improve the adhesion of the layers and mechanical strength.

As the optical substrates 1, there is no particular restriction, and there may be mentioned publicly known optical substrates such as lenses for eye glasses, and window glasses for houses and automobiles. Publicly known lenses for eye glasses include lenses made of plastics such as a (meth) acryl resin, a polycarbonate resin, an allyl resin, a thiourethane resin, a urethane resin, and a thioepoxy resin, and lenses made of glass, and any lenses for eye glasses may be used without particular restriction in the present invention. Especially, it is more preferable to use lenses for eye glasses made of (meth) acryl resin, a polycarbonate resin, an allyl resin, a thiourethane resin, a urethane resin, and a thioepoxy resin.

Plastic lenses for eye glasses generally have curved surfaces, and their convex surfaces are often complicated with the recent progress of the optical design, but in the present invention such lenses may be used as the optical substrate 1 without any problems. The thickness of the optical substrate 1 varies depending on its applications and is not particularly restricted, but in the use for eye glasses, the thickness is about 1 to 200 mm, for example.

Here, the optical substrate 1 may be treated by various kinds of surface treatments. Examples of such surface treatments include chemical treatments using basic or acidic aqueous solutions, polishing treatments using polishing materials, plasma treatments using an atmospheric-pressure plasma, a low-pressure plasma, and the like, and corona discharge treatments.

Especially in order to improve adhesion of the photochromic coat layer 3, it is preferable to form the primer layer 2 on the surface of the optical substrate 1. The primer layer 2 may be formed of various kinds of primer resins used for this purpose, but particularly urethane-type primer resins are preferably used in view of adhesiveness to the photochromic coat layer 3. Details of such urethane-type primer resins are disclosed in WO 2004/078476. The thickness of the primer layer is not particularly restricted, but is usually about 1 to 10 μm.

The photochromic coat layer 3 contains an alkylamino group-containing photochromic compound and/or a dialkylamino group-containing photochromic compound (hereinafter these are sometimes collectively referred to as the "(di)alkylamino group-containing photochromic compound") in a total amount of 0.1 to 10.0% by mass. The thickness of the photochromic layer is usually in the range of 5 to 100 μm. If the thickness is in this range, the above amount ensures sufficient photochromic properties. From the viewpoint of the photochromic characteristics, a suitable amount of the (di) alkylamino) alkylamino group-containing photochromic compound varies depending on the thickness of the photochromic coat layer 3, and the amount is preferably in the range of 0.2 to 5.0% by mass when the thickness is 20 to 50 μm and in the range of 0.3 to 3.0% by mass when the thickness is 30 to 40 μm.

When the photochromic coat layer 3 contains the (di)alkylamino)alkylamino group-containing photochromic compound, the migration of the compound to the hard coat layer 4 will cause the redness. If the amount of the compound is below the lower limit of the range, the problematic redness will not be caused even if the compound migrates to the hard coat layer 4, but the layer 3 does not have sufficient photochromic properties in such a case. Also, if the amount is beyond the upper limit, it tends to be difficult to disperse the compound homogeneously in the photochromic coat layer 3.

The alkyl groups contained in the alkylamino group in the (di)alkylamino group-containing photochromic compound are alkyl groups generally having 1 to 10 carbon atoms, preferably 1 to 7 carbon atoms, and are more preferably a methyl group or an ethyl group. When the number of carbon atoms exceeds the range, there is a tendency that the synthesis of these compounds is difficult. As such (di)alkylamino group-containing photochromic compounds, chromene derivatives represented by the following formula (1), especially the derivatives having a molecular weight of 540 or more, are preferably used.

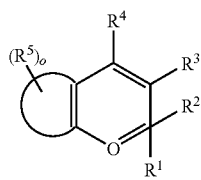

(1)

In the formula (1), the ring in the structure represented by the following formula (2) is

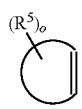

(2)

an "aromatic hydrocarbon ring" or an "unsaturated heterocyclic ring". As the "aromatic hydrocarbon rings", there may be mentioned rings having 6 to 20 carbon atoms such as a benzene ring, a naphthalene ring, an indenonaphthalene ring, a phenanthrene ring, a fluorene ring, and the like, and as the "unsaturated heterocyclic rings", there may be mentioned rings having 4 to 20 carbon atoms and as a heteroatom 1 or 2 nitrogen atom(s), oxygen atom(s), and sulfur atom(s), such as a thiophene ring, a benzothiophene ring, a benzofurane ring, an indole ring, a quinoline ring, a carbazole ring, a phenanthridine ring, and the like.

As substituent groups $R^5$ bonding to the ring, there may be mentioned any groups belonging to the following group A. Here, "o" which represents the number of the substituent groups that are bonded is an integer of 0 to 6.

[Group A] Alkyl groups having 1 to 8 carbon atoms; alkyloxy groups having 1 to 8 carbon atoms; aryloxy groups having 5 to 10 carbon atoms; amino groups; amino groups substituted with an alkyl group having 1 to 10 carbon atoms, aryl groups having 6 to 10 carbon atoms, acyl groups having 1 to 9 carbon atoms, a fluorine atom, or the like; cyano group; aryl groups having 6 to 10 ring-forming carbon atoms; halogen atoms such as fluorine, chlorine, or the like; perfluoroalkyl groups having 1 to 4 carbon atoms; perfluoroalkyloxy groups having 1 to 4 carbon atoms; acyl groups having 2 to 9 carbon atoms; alkoxycarbonyl groups having 2 to 9 carbon atoms; aryloxycarbonyl groups having 7 to 11 carbon atoms; arylalkyl groups having 7 to 18 carbon atoms; hydroxyl group; amide groups; N-substituted amide groups substituted by a hydrocarbon group having 1 to 8 carbon atoms; alkynyl groups having 1 to 8 carbon atoms; and heterocyclic groups which have a nitrogen atom as a heteroatom and in which the nitrogen atom is bonded to the structure to be substituted, such as 1-pyrrolidinyl, piperidino, morpholino, 2-quinolyl, pyrazolidine, quinuclidine, indole, indoline and carbazole. Here, the "aryl groups having 6 to 10 ring-forming carbon atoms", the "alkynyl groups having 1 to 8 carbon atoms", and the "heterocyclic groups which have a nitrogen atom as a heteroatom and in which the nitrogen atom is bonded to the structure to be substituted" each may contain a substituent group.

As the substituents, there may be mentioned any group belonging to the following group B.

[Group B] Alkyl groups having 1 to 8 carbon atoms; alkyloxy groups having 1 to 8 carbon atoms; amino groups; amino groups substituted with an alkyl group having 1 to 10 carbon atoms; cyano group; halogen atoms such as fluorine, chlorine, or the like; perfluoroalkyl groups having 1 to 2 carbon atoms; perfluoroalkyloxy groups having 1 to 2 carbon atoms; hydroxyl group; amide groups; acyl groups having 2 to 9 carbon atoms; alkoxycarbonyl groups having 2 to 9 carbon atoms;

N-substituted amide groups substituted by a hydrocarbon group having 1 to 8 carbon atoms;

heterocyclic groups which have a nitrogen atom as a heteroatom and in which the nitrogen atom is bonded to the ring to be substituted, such as 1-pyrrolidinyl, piperidino, morpholino, corondensed heterocyclic groups which are formed by condensing the heterocyclic groups with an aromatic hydrocarbon ring or an aromatic heterocyclic ring.

$R^1$ and $R^2$ in the formula (1) independently represent a group represented by the following formula (3) or formula (4), an "aromatic hydrocarbon group", an "unsaturated heterocyclic ring", or an "alkyl group".

$R^1$ and $R^2$ may together form an "aliphatic hydrocarbon ring or an aromatic hydrocarbon ring". However, from the viewpoint of photochromic characteristics, it is particularly preferable that at least one of $R^1$ and $R^2$ is a (di)alkylamino-substituted aromatic hydrocarbon group or a (di)alkylamino-substituted unsaturated heterocyclic group.

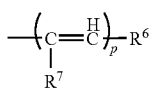

(3)

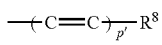

(4)

In the case when $R^1$ and $R^2$ independently represent a group shown in the formula (3) or the formula (4), $R^6$ and $R^8$ in the formulae (3) and (4) represent an "aromatic hydrocarbon group" or an "unsaturated heterocyclic group", $R^7$ represents a hydrogen atom, an alkyl group, or a halogen atom, and p and p' represent an integer of 1 to 3.

Here, as suitable "aromatic hydrocarbon groups", there may be mentioned a phenyl group and a naphthyl group, and as suitable "unsaturated heterocyclic groups", there may be mentioned a furyl group having 4 to 10 carbon atoms, a thienyl group, a benzothienyl group, a benzofuryl group, a pyrolyl group, an indolyl group, and a triazinyl group. These "aromatic hydrocarbon groups" and "unsaturated heterocyclic groups" may contain a substituent group, and the substituent groups include those belonging to the group B.

In the case when $R^1$ and $R^2$ are an "aromatic hydrocarbon groups" or an "unsaturated heterocyclic groups", these groups are the same as those mentioned in the formula (3) or (4), and so are the suitable groups.

In the case when $R^1$ and $R^2$ are "alkyl groups", there may be mentioned alkyl groups having 1 to 8 carbon atoms as the alkyl groups, and specifically a methyl group, an ethyl group, a butyl group, a t-butyl group, an isopropyl group, a cyclopropyl group, a cyclohexyl group, and the like may be mentioned as examples.

In the case when $R^1$ and $R^2$ together form an aliphatic hydrocarbon ring or an aromatic hydrocarbon ring, as these rings, there may be mentioned monocyclic hydrocarbon rings having 6 to 20 ring-forming carbon atoms, and condensed polycyclic hydrocarbon rings or bridged cyclic hydrocarbon groups having 6 to 20 ring-forming carbon atoms. To these rings may be bonded, via a Spiro bonding, a fluorene ring, a dihydroanthracene ring, a cyclohexane ring, an adamantane ring, an indene ring, and the like.

$R^3$ and $R^4$ in the formula (1) each independently represent any group belonging to the group B. However, in the formula (1), it is necessary that at least one of $R^1$, $R^2$, $R^3$, $R^4$, $R^5$, $R^6$, and $R^8$ is an alkylamino group or a dialkylamino group or a group containing an alkylamino group or a group containing a dialkylamino group.

Among the chromene compounds represented by the formula (1), the compounds represented by the following formulae (a) to (f) are particularly preferable in view of photochromic characteristics such as the color optical density and fade rate, and the durability.

(a) compounds represented by the following formula (5)

(5)

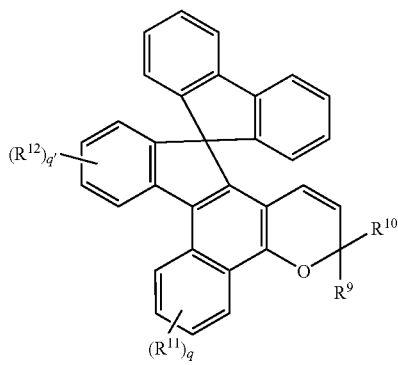

In the formula, $R^9$ and $R^{10}$ each have the same meaning as $R^1$ and $R^2$ in the formula (1); $R^{11}$ and $R^{12}$ each independently have the same meaning as $R^5$ in the formula (1); at least one of $R^9$, $R^{10}$, $R^{11}$, and $R^{12}$ is a (di)alkylamino group or a group containing a (di)alkylamino group; and q and q' each represent an integer of 1 to 2. Among the compounds represented by the formula (5), compounds in which $R^9$ and/or $R^{10}$ is a (di)alkylamino-substituted aromatic hydrocarbon group or a (di)alkylamino-substituted unsaturated heterocyclic group are particularly preferable.

(b) compound represented by the following formula (6)

(6)

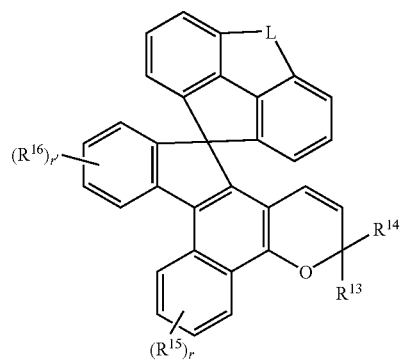

In the formula, $R^{13}$ and $R^{14}$ have the same meaning as $R^1$ and $R^2$ in the formula (1); $R^{15}$ and $R^{16}$ each independently have the same meaning as $R^5$ in the formula (1); at least one of $R^{13}$, $R^{14}$, $R^{15}$, and $R^{16}$ is a (di)alkylamino group or a group containing a (di)alkylamino group; r and r' independently represent an integer of 1 to 2; and L is any group represented by the following formulae.

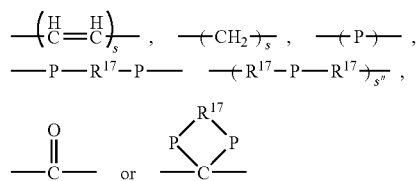

(In the formulae, P represents an oxygen atom or a sulfur atom, $R^{17}$ represents an alkylene group having 1 to 6 carbon atoms, and s, s', and s" represent an integer of 1 to 4).

Among the compounds represented by the formula (6), compounds in which $R^{13}$ and/or $R^{14}$ is a (di)alkylamino-substituted aromatic hydrocarbon group or a (di)alkylamino-substituted unsaturated heterocyclic group are particularly preferable.

(c) compound represented by the following formula (7)

(7)

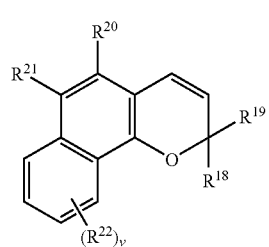

In the formula, $R^{18}$ and $R^{19}$ have the same meaning as $R^1$ and $R^2$ in the formula (1); $R^{20}$, $R^{21}$, and $R^{22}$ each independently have the same meaning as $R^5$ in the formula (1); at least one of $R^{18}$, $R^{19}$, $R^{20}$, $R^{21}$, and $R^{22}$ is a (di)alkylamino group or a group containing a (di)alkylamino group; and v represents an integer of 1 to 2. Among the compounds represented by the formula (7), compounds in which $R^{18}$ and/or $R^{19}$ is a (di)alkylamino-substituted aromatic hydrocarbon group or a (di)alkylamino-substituted unsaturated heterocyclic group are particularly preferable.

(d) compound represented by the following formula (8)

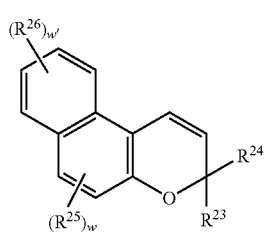

(8)

In the formula, $R^{23}$ and $R^{24}$ have the same meaning as $R^1$ and $R^2$ in the formula (1); $R^{25}$ and $R^{26}$ each independently have the same meaning as $R^5$ in the formula (1); at least one of $R^{23}$, $R^{24}$, $R^{25}$, and $R^{26}$ is a (di)alkylamino group or a group containing a (di)alkylamino group; and w and w' each independently represent an integer of 1 to 2. Among the compounds represented by the formula (8), compounds in which $R^{23}$ and/or $R^{24}$ is a (di)alkylamino-substituted aromatic hydrocarbon group or a (di)alkylamino-substituted unsaturated heterocyclic group are particularly preferable.

(e) compound represented by the following formula (9)

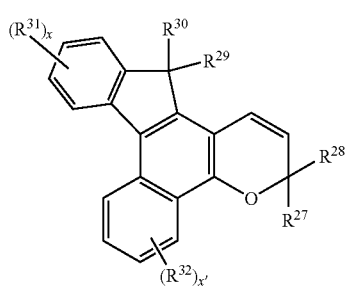

(9)

In the formula, $R^{27}$ and $R^{28}$ have the same meaning as $R^1$ and $R^2$ in the formula (1); $R^{29}$, $R^{30}$, $R^{31}$, and $R^{32}$ each independently have the same meaning as $R^5$ in the formula (1); at least one of $R^{27}$, $R^{28}$, $R^{29}$, $R^{30}$, $R^{31}$, and $R^{32}$ is a (di)alkylamino group or a group containing a (di)alkylamino group; and x and x' each independently represent an integer of 1 to 2. Among the compounds represented by the formula (9), compounds in which $R^{27}$ and/or $R^{28}$ is a (di)alkylamino-substituted aromatic hydrocarbon group or a (di) alkylamino-substituted unsaturated heterocyclic group are particularly preferable.

(f) compound represented by the following formula (10)

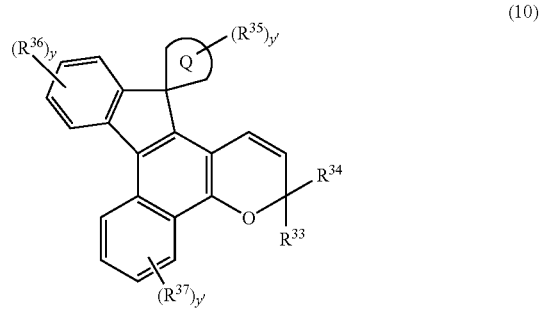

(10)

In the formula, $R^{33}$ and $R^{34}$ have the same meaning as $R^1$ and $R^2$ in the formula (1); $R^{35}$, $R^{36}$, and $R^{37}$ each independently have the same meaning as $R^5$ in the formula (1); at least one of $R^{33}$, $R^{34}$, $R^{35}$, $R^{36}$, and $R^{37}$ is a (di)alkylamino group or a group containing a (di)alkylamino group; the ring Q is an aliphatic hydrocarbon ring; and y, y', and y" each independently represent an integer of 1 to 2. Among the compounds represented by the formula (10), compounds in which $R^{33}$ and/or $R^{34}$ is a (di)alkylamino-substituted aromatic hydrocarbon group or a (di)alkylamino-substituted unsaturated heterocyclic group are particularly preferable.

In the present invention, among the (di)alkylamino-substituted chromene compounds represented by the formulae (5) to (10), chromene compounds having the following structures are more preferably used.

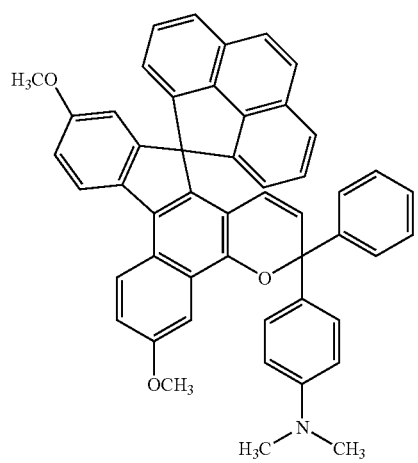

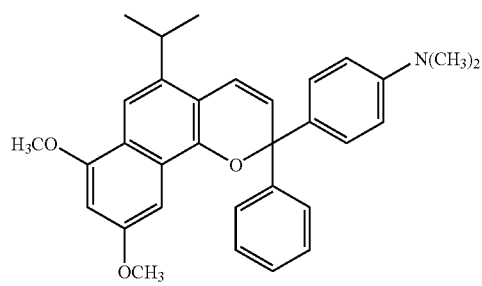

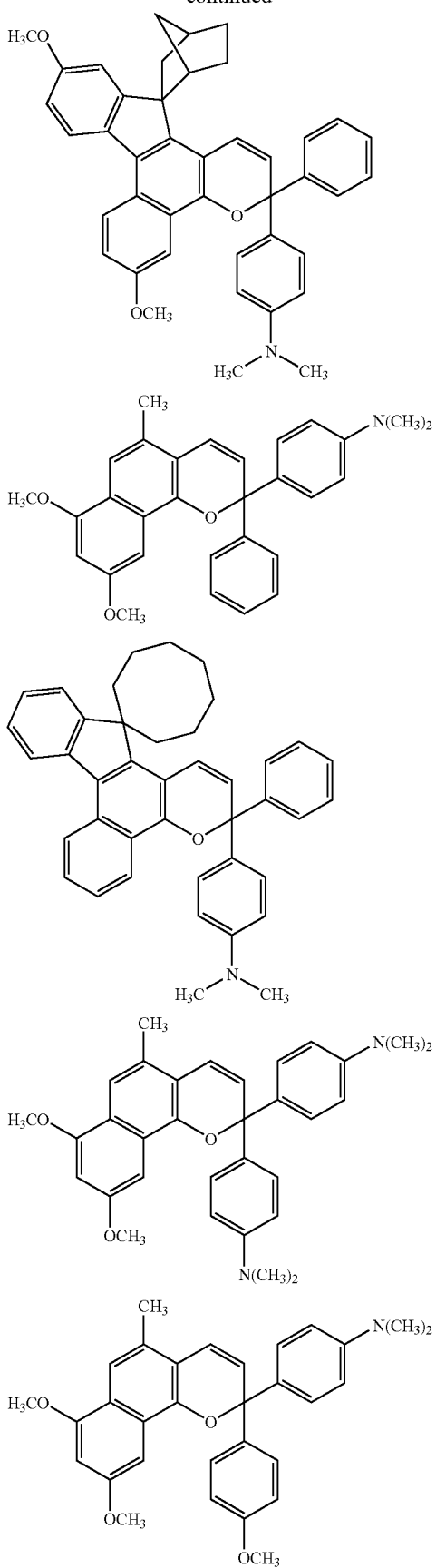

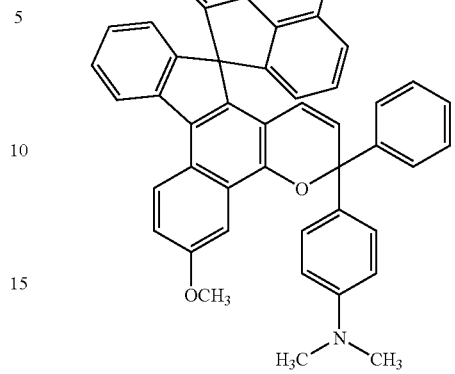

These (di)alkylamino group-containing photochromic compounds may be used singly or in a combination of two kinds more.

In addition to the (di)alkylamino group-containing photochromic compounds, the photochromic coat layer 3 may contain various kinds of publicly known photochromic compounds not containing the (di)alkylamino group as described above. For example, photochromic compounds such as flugimide compounds, spirooxazine compounds, chromene compounds, and the like, are well known, and these compounds may be used in the present invention.

As the above-mentioned flugimide compounds, spirooxazine compound, and chromene compounds, the compounds described in, for example, the Japanese Patent Application Laid-Open Publication No. H2-28154 and S62-288830 and WO 94/22850 and WO 96/14596 may be preferably used.

As the compounds having excellent photochromic properties, those described in the Japanese Patent Application Laid-Open Publication No. 2001-114775, 2001-031670, 2001-011067, 2001-011066, 2000-347346, 2000-344762, 2000-344761, 2000-327676, 2000-327675, 2000-256347, 2000-229976, 2000-229975, 2000-229974, 2000-229973, 2000-229972, 2000-219678, 2000-219686, 2000-219685, H11-322739, H11-286484, H11-279171, H10-298176, H09-218301, H09-124645, H08-295690, H08-176139, H08-157467, and the like may be used suitably too.

Among these photochromic compounds, the chromene-type photochromic compounds may be more preferably used because the compounds have higher durability in photochromic properties as compared with other photochromic compounds and are excellent in photochromic characteristics such as the color optical density and the fade rate. Among these chromene-type photochromic compounds, the compounds having a molecular weight of 540 or more are preferably used, because the compounds are particularly excellent in the color optical density and the fade rate. As examples of the compounds, chromene compounds represented by the formulae (5) to (10) and not containing the (di)alkylamino group may be mentioned. These photochromic compounds not containing the (di)alkylamino group may be used singly or in a combination of two kinds or more.

The amount of the photochromic compounds other than the (di)alkylamino) alkylamino group-containing photochromic compounds in the photochromic coat layer 3 is usually 0 to 5% by mass, but the amount is preferably 0 to 2.0% by mass when the thickness of the photochromic layer is 20 to 50 μm, and the amount is preferably 0.3 to 2.0% by mass when the thickness is 30 to 40 µm. If the total amount of the photochromic compounds is too low, color optical density may be lowered, and if it is too high, color optical density may be nonuniform because the compounds cannot be well dissolved into a later-mentioned radical-polymerizable monomer and thus the photochromic coating agent is inhomogeneous. Here, in the photochromic optical element 10 of the present invention, in order to obtain a suitable color development, it is preferable to make the concentration of the photochromic compounds high when the thickness of the photochromic coat layer 3 is thin, and to make the concentration low when the thickness is thick.

The photochromic coat layer 3 is formed by applying a photochromic coating agent containing the (di)alkylamino group-containing photochromic compound and optionally the additional photochromic compounds on the optical substrate 1 or on the primer layer 2 and curing the agent. The photochromic coating agent comprises the photochromic compounds as mentioned above and as appropriate a radical-polymerizable monomer, a photopolymerization initiator, and the like. Details of such coating agents are described in the Patent Document 1 (WO2003/011967) and the Patent Document 2 (Japanese Patent Application Laid-Open Publication No. 2003-342310).

In order to improve the durability of the photochromic compound, the rates of color development and fading, and moldability, additives such as surfactants (leveling agents) such as silicone-type and fluorine-type surfactants, antioxidants, radical scavengers, UV stabilizers, UV absorbers, mold-releasing agents, anti-coloring agents, antistatic agents, fluorescent dyes, dyes, pigments, fragrances, plasticizers, silane coupling agents, and the like may be added into the photochromic coat layer 3. The addition of thermal polymerization initiators may be preferable too. As such additives, publicly known compounds may be used without any restriction. Details of these additives are disclosed in the Patent Document 1, for example.

In the photochromic coat layer of the present invention, the amount of these additives is usually 1 to 20% by mass, and preferably 1 to 10% by mass.

The photochromic coating agent used to form the photochromic coat layer 3 preferably has a viscosity of 20 to 500 cp at 25° C. By controlling the viscosity of the coating agent in this range, the coating layer may be easily formed in a large thickness, specifically 5 to 100 µm. Thus, the photochromic characteristics can be sufficiently realized. Because the layer having expected thickness is formed easily, the viscosity of the coating agent at 25° C. is more preferably 50 to 200 cp, and optimally 60 to 200 cp.

The photochromic coat layer 3 may be formed by applying the photochromic coating agent and then curing it. As the coating method, publicly known methods such as spin coating, spray coating, dip coating, dip-spin coating, and the like may be used without any restriction, and the spin coating is particularly used because homogeneous layers are easily formed. The curing method is not particularly restricted either, but a preferably employed embodiment is a method wherein the coating agent containing a photopolymerization initiator is irradiated with a UV light to be cured and then is heated to complete the polymerization. When the curing is performed by applying light such as a UV light, publicly known light sources may be used without any restriction. Specific examples of the light sources include a super high-pressure mercury lamp, a high-pressure mercury lamp, a low-pressure mercury lamp, a xenon lamp, a carbon arc, a germicidal lamp, a metal halide lamp, an electrodeless lamp, and the like. The irradiation time using these sources may be determined arbitrarily depending on the kind, the absorption wavelength, and the sensitivity of the photopolymerization initiators, the thickness of the photochromic coat layer, and the like. When an electronic beam is used as the light source, the photochromic coat layer may be cured without a photopolymerization initiator.

Onto the obtained photochromic coat layer 3 is formed the hard coat layer 4. By coating the photochromic layer with the hard coat layer 4, the scratch resistance of the photochromic optical element 10 can be improved. The thickness of the hard coat layer 4 is usually about 1 to 5 µm. In the meanwhile, as hard coat agents for photochromic lenses obtained by the coating method, agents containing metal oxide fine particles and an organosilicon compound are usually used, but from the viewpoint of the pot-life, agents not containing a methyl trialkoxy silane or a tetraalkoxy silane are generally used. The methyl trialkoxy silanes and tetraalkoxy silanes have high reactivity in the siloxane-bond formation reaction as compared to alkoxy silane compounds having a relatively long carbon chain such as an epoxy-containing silicon compound usually used as an organosilicon compound. Thus, the performance of the hard coat agents containing these compounds tends to be deteriorated when temperature is increased during storage. For this reason, as hard coat agents for photochromic lenses, agents not containing these compounds are usually used. When a photochromic layer does not contain an alkylamino group-containing photochromic compound or a dialkylamino group-containing photochromic compound, there is no problem at all even if the above conventional hard coat agent is used. However, it has been found that when a photochromic layer contains at least one of the two photochromic compounds, the redness that was not caused in the past results is generated.

In the present invention, in order to solve the problem in the above particular system, the hard coat layer 4 is obtained by curing a hard coat agent containing metal oxide fine particles and an organosilicon compound. This hard coat agent contains at least one of the organosilicon compound selected from the group consisting of a tetraalkoxy silane, a methyl trialkoxy silane, and partial hydrolysates of them as the organosilicon compound (hereinafter these may be referred to as the specific silane compounds) in a specific amount.

Specifically, it is necessary that the total amount of the specific silane compounds contained in the hard coat agent is 10 to 60% by mass in terms of the alkoxy silane based on the total mass of the metal oxide fine particles and the organosilicon compounds (hereinafter the total mass may be referred to as the standard mass). When the specific silane compounds include the partial hydrolysate of the tetraalkoxy silane or the methyl trialkoxy silane, it is difficult to determine the mass of the hydrolysate as will be mentioned later. Therefore, the mass of the methyl trialkoxy silane or the tetraalkoxy silane prior to the partial hydrolysis is taken as the mass of the organosilicon compound which is used for the standard mass. When the hard coat agent contains an organosilicon compound other than the specific silane compounds and this compound is a partial hydrolysate of "a partially hydrolyzable organosilicon compound", the mass of this "partially hydrolysable organosilicon compound" is taken as the mass of the organosilicon compound which is used for the total mass. The mass of the metal oxide fine particles which is used for the standard mass means the mass of the metal oxide fine particles alone, and does not include the mass of sol-dispersion medium if the fine particles are used as a sol.

According to the hard coat layer 4 obtained by curing the hard coat agent composed of the composition as mentioned above, the photochromic compound does not transfer from the photochromic coat layer 3 to the hard coat layer 4. Therefore, even though the hard coat layer 4 contains metal oxide fine particles and a curing catalyst, the redness (redness of developed color tone) caused by interaction of these substances with the (di)alkylamino group-containing photochromic compound does not occur or is reduced. However, if the amount of the specific silane compound is too large, the obtained hard coat layer 4 is brittle, and thus cracks may be formed when the durability test (boiling test) is performed under sever conditions such as, for example, in boiling water. From the viewpoints of inhibition of the redness and durability under sever conditions, the amount of at least one member selected from the group composed of the tetraalkoxy silane, the methyl trialkoxy silane, and the partial hydrolysates of them (the specific silane compounds) contained in the hard coat agent in terms of % by mass based on the standard mass is preferably 10 to 50% by mass, more preferably 15 to 40% by mass, and particularly preferably 15 to 35% by mass.

From the viewpoints of a higher inhibition effect for the redness and a higher durability of the obtained hard coat layer, as the specific silane compounds, it is preferable to contain the methyl trialkoxy silane and/or the partial hydrolysate thereof as an essential component. By containing the methyl trialkoxy silane and/or the partial hydrolysate thereof, the durability of the hard coat layer at high temperature is improved, and thus, for instance, the cracking will not occur even if the boiling test is performed. The percentage of the methyl trialkoxy silane and/or the partial hydrolysate thereof to the specific silane compounds may be 10% by mass or more, and especially 25% by mass or more, in which case heat resistance at high temperatures may be ensured. However, the percentage is more preferably 50% by mass or more, and particularly preferably 70% by mass or more.

It is most preferable to use the methyl trialkoxy silane and/or the partial hydrolysate thereof as the specific silane compounds without the tetraalkoxy silane and/or the partial hydrolysate thereof.

The tetraalkoxy silane contained in the hard coat agent is represented by $Si(OR)_4$, and the methyl trialkoxy silane by $CH_3Si(OR)_3$. "R" in these formulae represents an alkyl group. Plural "R"s which are present in the molecule may be the same or different from each other, but it is preferable to use compounds in which all of "R"s are the same in view of availability. "R" is preferably an alkyl group having 1 to 3 carbon atoms in view of easiness in hydrolysis and condensation. These may be used singly or in a combination of two kinds or more. From the viewpoints of high safety and reactivity, it is most preferable to use tetraethoxy silane as the tetraalkoxy silane, and methyl trimethoxy silane or methyl triethoxy silane as the methyl trialkoxy silane. Although monoalkyl trialkoxy silanes have a similar structure to that of methyl trimethoxy silane, the use of such compounds in which the alkyl group directly bonded to the Si atom or the alkyl group in the alkoxy group has two or more carbon atoms may result in insufficient prevention of redness.

When the tetraalkoxy silane and the methyl trialkoxy silane form the hard coat layer, the silanes are hydrolyzed and condensed (formally release an alcohol and are condensed) to form a matrix of the hard coat layer. Therefore, they may be partially hydrolyzed in the hard coat agent, and thus they may be present as the compounds represented by $Si(OR)_{4-n}(OH)_n$ (n represents an integer of 1 to 3) and $CH_3Si(OR)_{3-n}(OH)_n$ (n represents an integer of 1 to 3), respectively. Further, they may be present as condensed oligomers of several (usually 2 to 3) molecules. In the present invention, the compounds represented by the formulae and the oligomers are collectively referred to as the partial hydrolysates.

Generally, the tetraalkoxy silane and the methyl trialkoxy silane react in the presence of water even at relatively low temperatures to be partially converted to partial hydrolysates. Since the reaction is affected by a coexisting compound and thus is complex, it is difficult to identify the quantity and the composition of the partial hydrolysates. For this reason, in the present invention, the masses of these partial hydrolysates are in terms of the tetraalkoxy silane or the methyl trialkoxy silane used as the starting raw materials.

According to the present invention, although the hard coat layer 4 contains metal oxide fine particles and a curing catalyst, a dense matrix of the hard coat layer is formed, and therefore prevents the photochromic compound from transferring from the photochromic coat layer 3 as mentioned above, thereby preventing or reducing the redness in the photochromic coat layer containing the (di)alkylamine group-containing photochromic compound.

The hard coat agents used in the present invention are not so much different from those used conventionally except that the specific amount of the specific silane compounds as the organosilicon compounds is used. For example, as the metal oxide fine particles, fine particles of an oxide of a metal element selected from Si, Al, Sn, Sb, Ta, La, Fe, Zr, Sn, Ti, In, W, Zn, and Ce which have been used in the conventional hard coat agents, may be used without particular restriction. In addition, composite fine particles containing two or more kinds of metal oxides selected from these metal elements may be used. Specific examples include fine particles of $SiO_2$, $Al_2O_3$, $SnO_2$, $Sb_2O_5$, $Ta_2O_5$, $La_2O_3$, $Fe_2O_3$, $ZrO_2$, $SnO_2$, $TiO_2$, $In_2O_3$, $WO_3$, $ZnO$, or $SeO_2$, and composite fine particles of two or more kinds selected form these metal oxides. These metal oxide fine particles or composite metal oxide fine particles may be used singly or in a combination of two kinds or more. Fine particles having an average diameter of 1 to 300 nm are generally used, and particles with 1 to 200 nm, and particularly 1 to 100 nm are preferably used.

These metal oxide fine particles are usually used as a sol. As the dispersion medium for the sols, alcoholic organic solvents such as methanol, ethanol, n-propanol, isopropanol, t-butylalcohol, n-butylalcohol, and the like are preferable, and methanol and 2-propanol are particularly preferable. The percentage of the metal oxide fine particles in the sol is preferably 10 to 40% by mass in order to prevent the fine particles from being unstable in the dispersion medium.

Examples of the preferably used sols containing the metal oxide fine particles include metal oxides such as a methanol-dispersed silica sol (manufactured by Nissan Chemical Industries, Ltd.), a methanol-dispersed $SnO_2$—$ZrO_2$—$Sb_2O_5$—$SiO_2$ composite metal oxide sol (manufactured by Nissan Chemical Industries, Ltd.), a methanol-dispersed $TiO_2$—$SnO_2$—$ZrO_2$—$Sb_2O_5$ composite metal oxide sol (manufactured by Nissan Chemical Industries, Ltd.), a methanol-dispersed $Sb_2O_5$ metal oxide sol (manufactured by Nissan Chemical Industries, Ltd.), and the like.

The amount of the metal oxide fine particles in the hard coat agent used in the present invention may be determined arbitrarily depending on the kind of the metal oxide, the intended physical properties of the finally obtained hard coat layer depending on its purpose, and the like, but the mass of the fine particles (not including the mass of the dispersion medium) based on the standard mass is usually 20 to 70% by mass in terms of % by mass, preferably 25 to 60% by mass, and optimally 30 to 60% by mass. When the amount of the metal oxide fine particles is less than 20% by mass, the scratch resistance of the coat layer, the adhesion between the coat layer and an inorganic layer formed by vapor deposition, and the like are insufficient, and when the amount is above 70% by mass, the layer tends to crack.

The hard coat agent used in the present invention may contain an organosilicon compound and/or a partial hydrolysate thereof (hereinafter sometimes referred to as the other organosilicon compound) other than the specific silane compounds. Here, as the other organosilicon compound, an organosilicon compound in which at least one alkoxy group is bonded to the silicon atom is preferably used. Epoxy-containing organosilicon compounds and/or partial hydrolysates thereof, which have been used in the conventional hard coat agents, have a function to enhance the adhesion of the hard coat layer, and thus the use of these organosilicon compounds as the other organosilicon compounds is a preferable embodiment of the present invention.

Any epoxy-containing organosilicon compound may be used without particular restriction as long as it is an organosilicon compound having at least one epoxy group in the molecule thereof, but there may be mentioned an organosilicon compound represented by the following formula (11) or a partial hydrolysate thereof as a preferable compound from the viewpoint of the effect as mentioned above.

$$(R_{38})_A(R_{39})Si(OR)_{3-A} \quad (11)$$

In the formula (11), R and $R_{38}$ each independently represent an alkyl group having 1 to 3 carbon atoms, and A represents an integer of 0, 1 or 2. If there is a plurality of R or $R_{38}$ in the molecule, they may be different with each other. R and $R_{38}$ are more preferably a methyl group or an ethyl group in view of high safety and reactivity, and A is preferably 0 or 1.

$R_{39}$ in the formula (11) is a group represented by the following formula

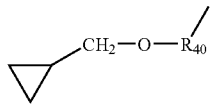

or by the following formula

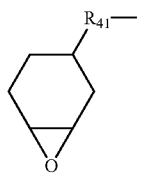

$R_{40}$ and $R_{41}$ in the formulae independently represent an alkylene group having 1 to 8 carbon atoms. The alkylene group may be a linear or a branched alkylene group, but from the viewpoint of availability a linear group having 2 or 3 carbon atoms is preferably used.

As such epoxy-containing organosilicon compounds, there may be mentioned γ-glycidoxypropyl trimethoxy silane, γ-glycidoxypropyl methyl dimethoxy silane, γ-glycidoxypropyl methyl diethoxy silane, γ-glycidoxypropyl triethoxy silane, and β-(3,4-epoxycyclohexyl)ethyl trimethoxy silane. Among them, from the viewpoints of the adhesion with the lens and the crosslinking properties, γ-glycidoxypropyl trimethoxy silane, γ-glycidoxypropyl methyl dimethoxy silane, and partial or complete hydrolysates and partial condensates of them are preferably used. These may be used singly or in a combination of two kinds or more.

As the other organosilicon compounds other than the epoxy-containing organosilicon compounds, compounds represented by any of the following formulae (12) to (14) and partial hydrolysates thereof may be used.

$$R_{42}(R_{43})_BSi(OR)_{3-B} \quad (12)$$

(In the formula, $R_{42}$ represents an organic group containing a hydrocarbon group having 2 to 6 carbon atoms, a vinyl group, a methacryloxy group, an acryl group, a mercapto group, or an amino group; $R_{43}$ represents an alkyl group having 1 to 3 carbon atoms; R represents an alkyl group having 1 to 3 carbon atoms; and B represents 0, 1, or 2.)

$$(R_{44})_CSi(OR)_{4-C} \quad (13)$$

(In the formula, $R_{44}$ represents a hydrogen atom, a vinyl group, an aryl group, or an alkyl group other than a methyl group; R represents an alkyl group having 1 to 3 carbon atoms; and C represents an integer of 1 or 2.)

$$(R_{45})_D(RO)_{3-D}Si—R_{46}—Si(OR)_{3-D}(R_{47})_D \quad (14)$$

(In the formula, $R_{46}$ represents a linear or a branched alkylene group having 1 to 8 carbon atoms; $R_{45}$ and $R_{47}$ represent an alkyl group having 1 to 3 carbon atoms; R represents an alkyl group having 1 to 3 carbon atoms; and D represents an integer of 0 to 2.)

Specific examples of the compounds represented by the formulae (12) to (14) include n-hexyl trimethoxy silane, n-octyl trimethoxy silane, n-octyl methyl dimethoxysilane, n-decyl trimethoxy silane, n-octadecyl trimethoxy silane, ethyl triethoxy silane, phenyl triethoxy silane, dimethyl dimethoxy silane, phenyl methyl dimethoxy silane, vinyl triethoxy silane, vinyl trimethoxy silane, vinyl tris(β-methoxyethoxy) silane, γ-glycidoxypropyl trimethoxy silane, γ-methacryloxypropyl trimethoxy silane, N-β(aminoethyl)γ-aminopropyl trimethoxy silane, N-β(aminoethyl)γ-aminopropyl methyl dimethoxy silane, γ-aminopropyl triethoxy silane, N-phenyl-γ-aminopropyl trimethoxy silane, γ-mercaptopropyl trimethoxy silane, bis(triethoxysilyl)ethane, bis(trimethoxysilyl)ethane, bis(triethoxysilyl)hexane, bis(diethoxymethylsilyl)hexane, bis(trimethoxysilyl)hexane, bis(dimethoxymethylsilyl)hexane, bis(triethoxysilyl)octane, bis(trimethoxysilyl)octane, bis(diethoxymethylsilyl)octane, 1-(triethoxysilyl)-2-(diethoxymethylsilyl)ethane, and a compound represented by the following formula (15). They may be used singly or in a combination of two kinds or more.

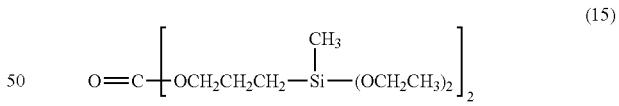

Of the compounds represented by the formula (13), bis(trimethoxysilyl)hexane is particularly preferable.

The amount of the other organosilicon compounds used in the hard coat agent of the present invention may be determined arbitrarily depending on intended physical properties and the like of the finally obtained hard coat layer depending on its purpose, but from the viewpoint of the scratch resistance of the hard coat layer, the amount is preferably as follows.

When the amount (total) of the specific silane compounds based on the standard mass is 10 to 60% by mass, and especially 10 to 50% by mass, the total mass of the organosilicon compounds (namely, the total mass of the specific silane compounds and the other organosilicon compounds) is preferably 30 to 80% by mass based on the standard mass (namely, the total mass of the other organosilicon compounds is preferably 0 to 70% by mass based on the standard mass); when the amount of the specific silane compounds based on the standard mass is 15 to 40% by mass, the total mass of the organosilicon compounds is preferably 40 to 75% by mass based on the standard mass (namely, the total mass of the other organosilicon compounds is preferably 0 to 60% by mass based on the standard mass); and when the amount of the specific silane compounds based on the standard mass is 15 to 35% by mass, the total mass of the organosilicon compounds is preferably 40 to 70% by mass based on the standard mass (namely, the total mass of the other organosilicon compounds is preferably 5 to 55% by mass based on the standard mass).

From the viewpoint of the adhesion between the hard coat layer and the antireflection layer optionally formed thereon, the hard coat agent preferably contains the epoxy-containing silicon compound in an amount of 15 to 60% by mass, and more preferably 20 to 50% by mass, based on the standard mass: Here, the masses of the partial hydrolysates are in terms of the masses of the raw materials thereof.

In the hard coat agent, an acidic aqueous solution is usually added in order to hydrolyze the organosilicon compounds. Any publicly known acids may be used without particular restriction. Examples of such acids include inorganic acids such as hydrochloric acid, sulfuric acid, nitric acid, phosphoric acid, and the like, and organic acids such as acetic acid, propionic acid, and the like. Among them, hydrochloric acid is preferably used from the viewpoints of storage stability of the coating composition and hydrolysis properties. A suitable concentration of the aqueous hydrochloric acid solution is 0.01 to 5 N. A preferable amount of water in the aqueous acid solution is 0.1 to 3 times the amount required to hydrolyze all of the hydrolysable groups in the organosilicon compound.

As the curing catalyst which is added to the hard coat agent, there may be mentioned acetylacetonate complexes having central metal atoms such as Li (I), Cu (II), Zn (II), Co (II), Ni (II), Be (II), Ce (III), Ta (III), Ti (III), Mn (III), La (III), Cr (III), V (III), Co (III), Fe (III), Al (III), Ce (IV), Zr (IV), V (IV), and the like; perchloric acid compounds such as perchloric acid, magnesium perchlorate, aluminum perchlorate, zinc perchlorate, ammonium perchlorate, and the like; organometallic salts such as sodium acetate, zinc naphthenate, cobalt naphthenate, zinc octoate, and the like; and Lewis acids such as stannic chloride, aluminum chloride, ferric chloride, titanium chloride, zinc chloride, antimony chloride, and the like. These curing catalysts may be used singly or in a combination of two kinds or more without any problems. Among these catalysts, it is preferable to use the acetylacetonate complexes, particularly aluminum acetylacetonate complexes, from the viewpoints of the inhibition of the redness and less interaction of the catalyst with the (di)alkylamino group-containing photochromic compound.

The amount of the curing catalyst is not particularly restricted, but it is preferably 0.05 to 5.0 parts by mass, and particularly 0.1 to 4.0 parts by mass based on 100 parts by mass of the standard mass. However, among the curing catalysts, the perchloric acid compounds have high reactivity with the (di)alkylamino group-containing photochromic compounds, and thus when these compounds are used, realization of the inhibition effect for the redness tends to be difficult as compared with the case that the acetylacetonate complexes are used. Therefore, when the perchloric acid compounds are used as the curing catalysts, especially in an amount of 0.5 part by mass or more based on 100 parts by mass of the standard mass, it is preferable to make the amount of the specific silane compound 15% by mass or more based on the standard mass, in order to obtain a sufficient inhibition effect for the redness. Namely, when 0.5 part by mass or more of the perchloric acid compounds is used as the curing catalysts based on 100 parts by mass of the standard mass, the amount of the specific silane compound based on the standard mass is preferably 15 to 60% by mass, more preferably 20 to 50% by mass, and particularly preferably 25 to 45% by mass. The amount of the metal oxide fine particles in this case (not including the mass of the dispersion medium) is preferably 20 to 60% by mass, more preferably 25 to 50% by mass, and particularly preferably 30 to 45% by mass, based on the standard mass.

On the other hand, when the Lewis acid or the acetylacetonate complex, especially the latter is used as the curing catalyst, a sufficient inhibition effect for the redness can be obtained when the amount of the specific silane compound based on the standard mass is 10% by mass or more.

The hard coat agent used in the present invention may preferably contain a quaternary ammonium salt and/or a quaternary phosphonium salt (hereinafter sometimes collectively referred to as the quaternary salt) in order to improve the adhesion between the hard coat agent and the substrate or the photochromic layer. By using the hard coat agent containing the quaternary salt, an effect which enables to improve the adhesion of the hard coat layer by the chemical etching using an alkaline aqueous solution which can be done with simple operation and does not require special equipment can be realized in addition to the original effect such as preventing the redness at the time of no light irradiation and preventing color tones shift from the expected color tones at the time of color development. The chemical etching with an alkaline aqueous solution is advantageous from the viewpoint of the production yield and cost because it can wash the lens substrate as well. Although the mechanism in which the addition of the quaternary salt causes the effect is not clear, the improved adhesion is thought to be due to the functions of the quaternary salt as a catalyst which accelerates a reaction of the epoxy groups of the epoxy-containing organosilicon compound, and as a surfactant.

As the quaternary salts, quaternary ammonium salts or quaternary phosphonium salts in which a nitrogen atom or phosphorus atom is bonded to an alkyl group having 1 to 4 carbon atoms are preferable, and salts having a halogen atom as a counter ion are preferable. Specific examples of the quaternary salts include quaternary ammonium salts such as tetramethyl ammonium chloride, tetramethyl ammonium bromide, tetra-n-butyl ammonium chloride, tetra-n-butyl ammonium bromide, dimethyl diisopropyl ammonium chloride, tetra-n-butyl ammonium acetate, tetra-isopropyl ammonium chloride, and the like; and quaternary phosphonium salts such as tetramethyl phosphonium chloride, tetramethyl phosphonium bromide, tetra-n-butyl phosphonium chloride, tetra-n-butyl phosphonium bromide, and the like. Among them, tetramethyl ammonium chloride, tetramethyl ammonium bromide, tetra-n-butyl ammonium chloride, and tetra-n-butyl ammonium bromide are preferably used in view of availability and improvement of adhesion.

The amount of the quaternary salts added into the hard coat agent (the total amount of the quaternary salts) may be determined arbitrarily depending on the composition of the hard coat agent or the quaternary salts used, but the amount is preferably 0.001 to 1.0 part by mass, and more preferably 0.01 to 0.5 part by mass, based on 100 parts by mass of the standard mass. A small amount of the salts may suffice in the hard coat layer, and when the amount is 1.0 part by mass or more, the whitening of the hard coat layer may occur, and thus such an amount is not preferable.

In a preferable method for preparing the hard coat agent with addition of the quaternary salt, a mixture of the salt with the acid hydrolysis catalyst is added or an aqueous solution of the quaternary salt is added in the step wherein the organosilicon compound is hydrolyzed in an aqueous solution.

The hard coat agent used in the present invention may contain an organic solvent as appropriate. The organic solvent used herein will be capable of sufficiently dispersing the metal oxide fine particles (the dispersion medium in the metal oxide fine particle sol is also one of the organic solvents used herein). Suitable solvents are volatile and can sufficiently dissolve the epoxy-containing silicon compound, tetraethoxy silane, the methyl trialkoxy silane, the curing catalyst and the like. Specific examples of such solvents include alcohols such as methanol, ethanol, n-propanol, isopropanol, n-butanol, t-butanol, n-pentanol, and the like; esters such as methyl acetate, ethyl acetate, propyl acetate, ethyl propionate, methyl acetoacetate, ethyl acetoacetate, ethyl lactate, and the like; ethers such as ethylene glycol monoisopropyl ether, ethylene glycol monoethyl ether, ethylene glycol mono-n-propyl ether, ethylene glycol mono-n-butyl ether, ethylene glycol mono-t-butyl ether, propylene glycol monomethyl ether, propylene glycol monoethyl ether, propylene glycol mono-n-propyl ether, propylene glycol mono-n-butyl ether, propylene glycol monoethyl ether acetate, propylene glycol monoethyl ether acetate, dioxane, and the like; ketones such as acetone, acetylacetone, diacetone alcohol, and the like; halogenated hydrocarbons such as methylene chloride and the like; hydrocarbons such as hexane, heptane, cyclohexane, benzene, toluene, xylene, and the like. These solvents may be used singly, but a mixture of two kinds or more is preferably used in order to control physical properties of the hard coat agent.

Among these solvents, from the viewpoints of the dispersibility of the metal oxide fine particles, the solubility to the aqueous acid solution used for the hydrolysis of the epoxy-containing silicon compound, tetraethoxysilane, methyl triethoxy silane, and the like, the easiness in evaporation at the time of coat layer formation, and the formation of a smooth coat layer, it is preferable to use methanol, isopropanol, t-butanol, acetylacetone, diacetone alcohol, ethylene glycol monoisopropyl ether, and the like. The amount of the organic solvents is not particularly restricted, but is usually 50 to 100 parts by mass, and preferably 100 to 500 parts by mass based on 100 parts by mass of the standard mass.

In the hard coat agent used in the present invention may contain additional additives as appropriate. Specific examples of such additives include surfactants, antioxidants, UV stabilizers, UV absorbers, anti-coloring agents, antistatic agents, fluorescent dyes, dyes, pigments, fragrances, and the like. The total amount of these additives based on 100 parts by mass of the standard mass is preferably 0.001 to 10 parts by mass, and more preferably 0.01 to 5 parts by mass.

As the surfactants, any of nonionic, anionic, and cationic surfactants may be used, but it is preferable to use the nonionic surfactants. Specific examples of preferably used nonionic surfactants include a sorbitan fatty acid ester, a glycerine fatty acid ester, a decagricerine fatty acid ester, a propylene glycol/pentaerythritol fatty acid ester, a polyoxyethylene sorbitan fatty acid ester, a polyoxyethylene sorbit fatty acid ester, a polyoxyethylene glycerine fatty acid ester, a polyethylene glycol fatty acid ester, a polyoxyethylene alkyl ether, a polyoxyethylene phytosterol/phytostanol, a polyoxyethylene polyoxypropylene alkyl ether, a polyoxyethylene alkyl phenyl ether, a polyoxyethylene castor oil/hydrogenated castor oil, a polyoxyethylene lanolin/lanolinalcohol/beeswax derivative, a polyoxyethylene alkylamine/fatty acid amide, a polyoxyethylene alkyl phenyl formaldehyde condensate, a homogeneous polyoxyethylene alkyl ether, and the like. The surfactants especially preferably include silicone-type and fluorine-type surfactants. As the silicone-type surfactants, publicly known surfactants having a silicone chain (a polyalkylsiloxane unit) as a hydrophobic group may be used without any restriction. As the fluorine-type surfactants, there is no restriction as long as the surfactants have a fluorine-containing carbon chain, and oligomers of perfluoroalkyl-containing esters, perfluoroalkyl-containing alkylene oxide adducts, fluorine-type aliphatic polymer esters, and the like may be used. Specific examples of the silicone-type surfactants and the fluorine-type surfactants include "L-7001", "L-7002", "1-7604", and "FZ-2123" (all manufactured by Nippon Unicar Company Ltd.), "Megafac F-470", "Megafac F-1405", and "Megafac F-479" (all manufactured by Dainippon Ink and Chemicals Incorporated), "Flowrad FC-430" (manufactured by Sumitomo 3M Ltd.), and the like. These surfactants may be used as a mixture of two kinds or more. The amount of the surfactants added is preferably 0.01 to 1 part by mass based on 100 parts by mass of the standard mass.

As the antioxidants, the UV stabilizer, and the UV absorber, a hindered amine light stabilizer, a hindered phenol antioxidant, a phenol-type radical scavenger, a sulfur-type antioxidant, a benzotriazole compound, a benzophenone compound, and the like may be suitably used. These antioxidants, radical scavengers, UV stabilizers, and UV absorbers may be used as a mixture of two kinds or more. In addition, a surfactant may be used with the antioxidant, the UV stabilizer, or the UV absorber. The amount of these antioxidants, UV stabilizers, and UV absorbers is preferably 0.001 to 5 parts by mass based on 100 parts by mass of the standard mass.

In the photochromic optical element 10 of the present invention, the antireflection layer 5 may be formed on the hard coat layer 4 by the vapor deposition of metal oxides such as $SiO_2$, $TiO_2$, $ZrO_2$, and the like, or by the thin coating of an organic polymer. An impact-resistant primer such as a urethane primer may be applied between them, and further the processings and the secondary treatments such as an antistatic treatment, a repellent treatment, an anti-clouding treatment, and the like may be carried out on the antireflection layer 5.

According to the photochromic optical element 10 of the present invention, the redness (redness of developed color tone) may be prevented or reduced even after the hard coat layer is formed on the photochromic coat layer containing the (di)alkylamino group-containing photochromic compounds in high concentration.

For instance, in the case that a hard coat layer is formed by using a hard coat agent containing the metal oxide fine particles, the organosilicon compounds and the curing catalysts, but not containing tetraethoxy silane, methyl triethoxy silane or hydrolysates thereof, when a* values are measured at the time of light irradiation (at the time of color development) of the photochromic optical element before and after the formation of the hard coat layer, the difference of the a* values [Δ(a*)] before and after the formation of the hard coat layer is more than 1.0. In contrast, according to the hard coat agent of the present invention, [Δ(a*)] is 1.0 or less.

Here, the a* value means a* ("a" star) in the CIE1976 (L*a*b*) color space (CIELAB), and it may be obtained, for instance, as follows. The element is irradiated with a xenon lamp L-2480 (300 W) SHL-100 (manufactured by Hamamatsu Photonics K. K.) through a UV transmitting filter UV22 and a thermal beam absorbing filter HA50 (both are manufactured by HOYA CORPORATION) at 20° C.±1° C. with a beam intensity of 2.4 mW/cm² at 365 nm and 24 μW/cm² at 245 nm on the surface of the polymer for 120 seconds to develop a color. The developed and faded color tones are measured with a spectrophotometer (instant multi-channel photodetector MCPD 3000, manufactured by Otsuka Electronics Co., Ltd.), and a* values are determined by the color computation analysis after the measurements.

In the following, a method for manufacturing the photochromic optical element 10 of the present invention will be described.

A method for manufacturing the photochromic optical element of the present invention produces the photochromic optical element in which the optical substrate, the photochromic coat layer, and the hard coat layer are laminated in this order. The method includes a step wherein the hard coat agent containing the metal oxide fine particles and the organosilicon compound is applied on the photochromic coat layer provided on the optical substrate, and then is cured to form the hard coat layer, wherein the hard coat agent is the hard coat agent as mentioned above.

Specifically, the optical substrate 1 is provided first and the surface thereof is washed. In order to improve the adhesion with the photochromic coat layer, the surface of the optical substrate 1 may be subjected to various kinds of treatments, such as a corona treatment, a plasma treatment and the like, and the primer layer 2 may be formed as mentioned before. Formation of the primer layer 2 is performed for instance by applying a coating solution such as the urethane-type primer resin and the like by publicly known methods such as spin coating, spray coating, dip coating, dip spin coating, and the like, and then curing the layer.

Next, the aforementioned photochromic coating solution is applied on the optical substrate 1 (or on the primer layer 2) and then cured to form the photochromic coat layer 3. Then, the hard coat agent is applied on the photochromic coat layer 3 and cured to form the hard coat layer 4, and optionally the antireflection layer 5 is formed on the hard coat layer 4 by a publicly known method to give the photochromic optical element 10. When the hard coat agent is applied, it is preferable to use the agent as soon as possible after preparation thereof from the viewpoint of pot-life thereof. For example, the agent is used usually in 5 weeks or less after the preparation and preferably in 3 weeks or less. When the agent should be used after being stored for a relatively long period, it is preferable to carefully control such storing conditions as a temperature, a humidity, an atmosphere, and the like. For example, the pot-life may be prolonged by storing the agent under the conditions of a dry atmosphere with a temperature of not exceeding 25° C., preferably not exceeding 20° C.

In the following the present invention will be described by Examples and Comparative Examples, but it is not restricted to these Examples.

Lens substrates, primer components, photochromic coat layer components, and hard coat layer components used in Examples 1 to 14 and Comparative Examples 1 and 2 are shown below.

1) Lens Substrates

CR (a plastic lens of an allyl resin: refractive index=1.50)

MRA (a plastic lens of a thiourethane-based resin: refractive index=1.60)

MRB (a plastic lens of a thiourethane-based resin: refractive index=1.67)

TE (a plastic lens of a thioepoxy-based resin: refractive index=1.71)

SE (a lens of a methacryl resin and a vinyl resin: refractive index=1.60)

2) Primer Components

Takeseal PFR402TP-4 (a moisture-curable primer, manufactured by Takebayashi Chemical Industry Co., Ltd.)

Takeseal PFR 4 (a moisture-curable primer, manufactured by Takebayashi Chemical Industry Co., Ltd.)

3) Photochromic Coat Layer Components

[Radical-Polymerizable Monomers]

TMPT: trimethylolpropane trimethacrylate

U6A: urethane oligomer hexaacrylate (U-6HA, manufactured by Shin-Nakamura Chemical Co., Ltd.)

EB6A: polyester oligomer hexaacrylate (EB1830, manufactured by Daicel-UCB Company, Ltd.)

GMA: glycidyl methacrylate

BPE: 2,2-bis(4-methacryloyloxypentaethoxyphenyl)propane

9GDA: polyethylene glycol diacrylate (average molecular weight of 532)

BPE Oligo:
2,2-bis(4-acryloyloxypolyethyleneglycolphenyl)propane with average molecular weight of 776

(Di)alkylamino Group-Containing Photochromic Compounds

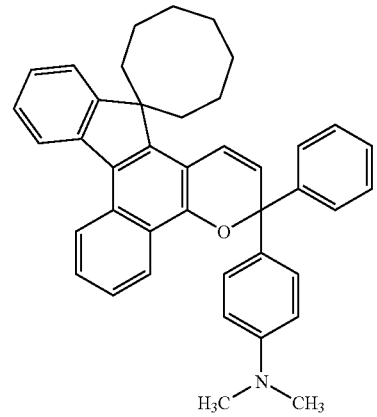

PC1

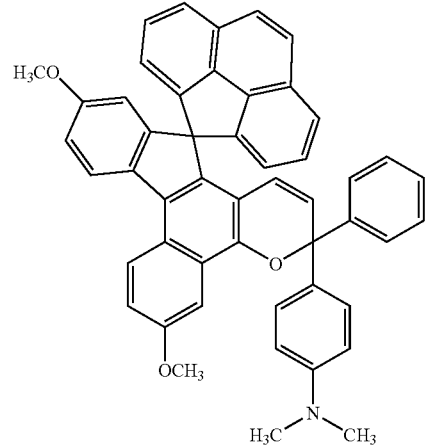

PC2

[Photochromic Compounds Other than the (Di)Alkylamino Group—Containing Photochromic Compounds]

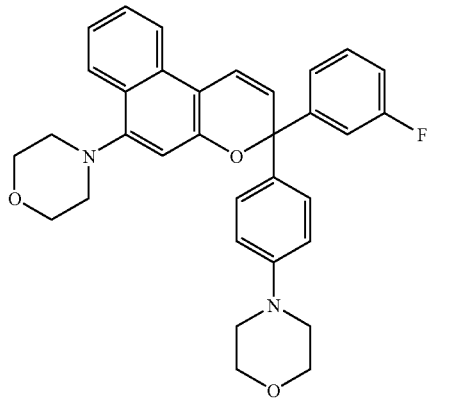

PC3

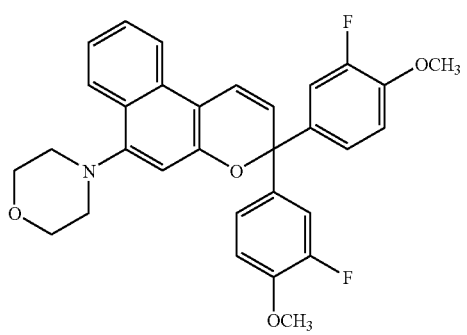

PC4

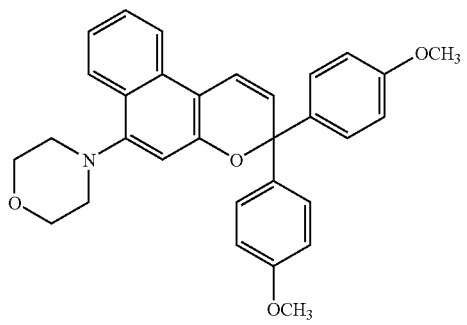

PC5

[Photopolymerization Initiators]
CGI 1800: a mixture of 1-hydroxycyclohexyl phenyl ketone and bis(2,6-dimethoxybenzoyl)-2,4,4-trimethyl-pentylphosphine oxide (weight ratio of 3:1)
CGI 1870: a mixture of 1-hydroxycyclohexyl phenyl ketone and bis(2,6-dimethoxybenzoyl)-2,4,4-trimethyl-pentylphosphine oxide (weight ratio of 3:7)
[Stabilzers]
LS 765: bis(1,2,2,6,6-pentamethyl-4-piperidyl) sebacate
[Leveling Agents]
SiL 1: a silicone-type surfactant "L7001" (manufactured by Dow Corning Toray Co., Ltd.)
SiL 2: a silicone-type surfactant "FZ2104" (manufactured by Dow Corning Toray Co., Ltd.)
[Silane Coupling Agent]
TSL: γ-methacryloyloxypropyl trimethoxy silane
4) Hard Coat Layer Components
[Metal Oxide Fine Particles]
SOL 1: a methanol-dispersed silica sol (solid content concentration of 30% by mass, manufactured by Nissan Chemical Industries, Ltd.)

SOL 2: a methanol-dispersed $SnO_2$—$ZrO_2$—$Sb_2O_5$—$SiO_2$ composite metal oxide sol (solid content concentration of 30% by mass, manufactured by Nissan Chemical Industries, Ltd.)
SOL 3: a methanol-dispersed $TiO_2$—$SnO_2$—$ZrO_2$—$Sb_2O_5$ composite metal oxide sol (solid content concentration of 30% by mass, manufactured by Nissan Chemical Industries, Ltd.)
SOL 4: a methanol-dispersed $Sb_2O_5$ metal oxide sol (solid content concentration of 30% by mass, manufactured by Nissan Chemical Industries, Ltd.)
[Methyl Trialkoxy Silane]
MTEOS: methyl triethoxy silane
[Epoxy-Containing Silicon Compounds]
GTS: γ-glycidoxypropyl trimethoxy silane
GDS: γ-glycidoxypropyl methyl dimethoxy silane
ETS: β-(3,4-epoxycyclohexyl)ethyl trimethoxy silane
[Other Organosilicon Compounds]
HTS: n-hexyl trimethoxy silane
An organosilicon compound B1

BISSI: bis(trimethoxysilyl)hexane
[Organic Solvents]
MeOH: methanol
IPA: isopropanol
TBA: t-butanol
EGPE: ethylene glycol monoisopropyl ether
EGEE: ethylene glycol monoethyl ether
EGBE: ethylene glycol mono-t-butyl ether
PGPE: propylene glycol mono-n-propyl ether
AcAc: acetylacetone
DAA: diacetone alcohol
DIO: dioxane
[Curing Catalysts]
C1: tris(2,4-pentanedionato)aluminum (III)
C2: tris(2,4-pentanedionato)iron (III)
C3: magnesium perchlorate Example 1

1. Preparation of Lens Element Having Cured Photochromic Layer

As the lens substrate, MRB (a plastic lens of a thiourethane-based resin: refractive index=1.67) having a thickness of 2 mm was used. The substrate was fully degreased with acetone. Takeseal PFR402TP-4 (a moisture-curable primer, manufactured by Takebayashi Chemical Industry Co., Ltd.) as the primer and ethyl acetate were mixed in 50 parts by mass each. To the mixture was added 0.03 part by mass of SiL2 (FZ-2104: a leveling agent manufactured by Dow Corning Toray Co., Ltd.), and then the mixture was sufficiently stirred under a nitrogen atmosphere to uniformity to give a primer composition (A) (refer to Table 1). The composition was applied on the surface of the MRB lens substrate with spin-coater 1H-DX2 (manufactured by Mikasa Co., Ltd.). The lens thus obtained was allowed to stand at room temperature for 15 minutes to give a lens element having a primer layer.

Then, approximately 1 g of a polymerizable photochromic composition was applied on the surface of the above-mentioned lens element having the primer layer by spin coating.

As the polymerizable photochromic composition, Composition (I) prepared by the following method was used.
Preparation of Composition (I): Firstly, the Radical polymerizable monomers:
2,2-bis(4-methacryloyloxypentaethoxyphenyl)propane/polyethylene glycol diacrylate (average molecular weight of 532)/trimethylolpropane trimethacrylate/polyester oligomer hexaacrylate (EB-1830, manufactured by Daicel-UCB Company, Ltd.)/glycidyl methacrylate were mixed in a ratio of 40/15/25/10/10 parts by mass. Based on 100 parts by mass of the mixture thus obtained, 2.0 parts by mass of the photochromic compound (PC1) having the structure shown by the following formula:

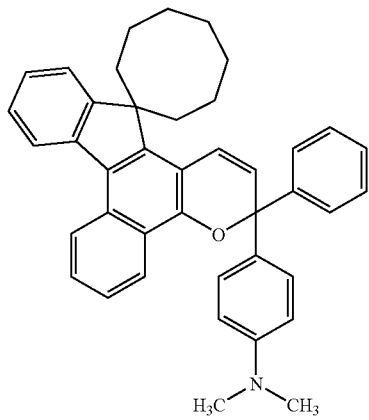 [SMILES: CN(C)c1ccc(C2(c3ccccc3)C=Cc3c4c(c5ccccc5c3O2)-c2ccccc2C42CCCCCCC2)cc1]

0.6 part by mass of the photochromic compound (PC3) having the structure shown by

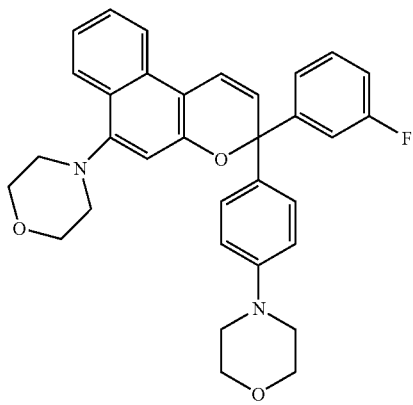 [SMILES: Fc1cccc(C2(c3ccc(N4CCOCC4)cc3)C=Cc3c(cc(N4CCOCC4)c4ccccc34)O2)c1]

and 0.4 part by mass of the photochromic compound (PC4) having the structure shown by

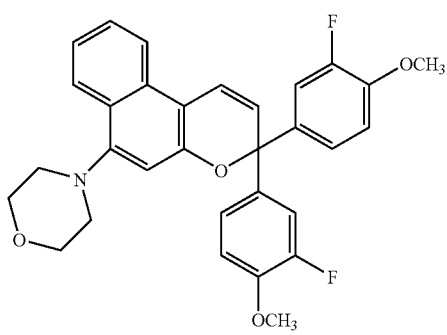 [SMILES: COc1ccc(C2(c3ccc(OC)c(F)c3)C=Cc3c(cc(N4CCOCC4)c4ccccc34)O2)cc1F]

were added, and the mixture was fully mixed. Thereafter, into the composition thus obtained were added 0.5 part by mass of CGI 1800 (polymerization initiator mixture composed of 1-hydroxycyclohexyl phenyl ketone and bis(2,6-dimethoxybenzoyl)-2,4,4-trimethyl-pentyl phosphine oxide in a weight ratio of 3:1), 5 parts by mass of bis(1,2,2,6,6-pentamethyl-4-piperidyl)sebacate as stabilizer, 7 parts by mass of γ-methacryloyloxypropyl trimethoxy silane as silane coupling agent, and 0.1 part by mass of SiL 1 as leveling agent (L-7001: a silicone-type surfactant, manufactured by Dow Corning Toray Co., Ltd.), and the mixture was fully mixed to give the composition (I) (refer to Table 2). The viscosity of the obtained polymerizable photochromic composition (Composition (I)) at 25° C. was 130 cP.

Under a nitrogen atmosphere, the lens whose surface was coated with the Composition (I) was irradiated with a metal halide lamp whose output at 405 nm was adjusted to 130 mW/cm$^2$ on the lens surface, for 3 minutes and the coated layer was cured. Then, the heat treatment was carried out in an oven controlled at 120° C. and a cured photochromic thin layer was obtained. The thickness of the layer can be controlled by altering the conditions of the spin coating. The thickness of the cured photochromic thin layer was adjusted to 40±1 μm in the present invention.

2. Evaluation of Lens Substrate Having Cured Photochromic Layer

In order to evaluate the photochromic characteristics of the lens substrate having the cured photochromic layer as obtained above, the color optical density was measured in the following way.

Firstly, the obtained lens having the photochromic coat layer was caused to develop a color by being irradiated with xenon lamp L-2480 (300 W) SHL-100 (manufactured by Hamamatsu Photonics K. K.) through a UV transmitting filter UV22 and a heat-ray absorbing filter HA50 (both were manufactured by HOYA CORPORATION) at 20° C.±1° C. and with a beam intensity of 2.4 mW/cm$^2$ (365 nm) and 24 μW/cm$^2$ (245 nm) at the surface of the polymer for 120 seconds. Then, the maximum absorption wavelength was measured with a spectrophotometer (instantaneous multi-channel photodetector MCPD 3000, manufactured by Otsuka Electronics Co., Ltd.). The color optical density was determined as [ε(120)−ε(0)] which was the difference between an absorbance at this maximum absorption wavelength [ε(120)] and an absorbance of the cured layer at this wavelength without irradiation [ε(0)].

The color optical density of the lens element obtained by the above-mentioned method was 1.10 at the maximum absorption wavelength of 588 nm, and thus the lens element had good photochromic characteristics.

The a* values at the times of color development and fading were measured. The a* values at the times of color development and fading were 1.1 and −1.5, respectively. Here, the term "at the time of color development" means the time after the surface of the lens element was irradiated for 2 minutes with the xenon lamp whose intensity was set at the above intensity, and the term "at the time of color fading" (which corresponds to the time without color development) means the time after the lens was allowed to stand in a dark place for 5 minutes after the irradiation with the xenon lamp for 2 minutes.

3. Formation of Hard Coat Layer

Then, the lens element having the cured photochromic layer was coated with a hard coat agent (a) which was prepared in the following way.

Preparation of hard coat agent (a): Firstly, 27.2 g of γ-glycidoxypropyl trimethoxy silane and 21.9 g of methyl triethoxy silane as the organosilicon compounds, and 11.8 g of t-butylalcohol, 11.8 g of acetylacetone, 37.6 g of methanol, and 5.2 g of ethylene glycol monoisopropyl ether as the organic solvents were mixed. Into this solution was added 12.9 g of aqueous 0.05N hydrochloric acid solution while the solution was thoroughly stirred. The solution was stirred for 5 hours after the completion of the addition. Then, 0.1 g of a silicone-type surfactant (trade name "L-700", manufactured by Nippon Unicar Company Ltd.), 0.7 g of tris (2,4-pentanedionato) aluminum (III), and 91.7 g of a methanol-dispersed silica sol (solid content concentration of 30% by mass, manufactured by Nissan Chemical Industries, Ltd.) were added and the mixture was stirred for 5 hours, and then aged overnight to give the hard coat agent (a) of the present invention (refer to Table 3).

The mass of the "metal particle sol" in Table 3 i includes the mass of the dispersion medium, and the mass of the metal oxide fine particles is determined from the mass of the metal oxide sol and the concentration of the metal oxide fine particles. The mass of the "organic solvent" in Table 3 does not include the mass of the dispersion medium for the metal particle sol. The same applies for Tables 4, 8, 9, and 13.

Coating of the hard coat agent (a) was carried out in the following way. Specifically, the lens element having the cured photochromic layer was treated by a corona discharge treatment (both sides) and immersed in 10%-NaOH aqueous solution at 50° C. for 5 minutes. The treated element was dipped in the hard coat agent (a), and then was lifted at a rate of 30 cm/minute so that the surface of the lens element having the photochromic cured layer was coated with the agent (a). After the coating, the lens element was dried at 70° C. for 20 minutes and allowed to stand at 110° C. for 2 hours so that the agent was cured to form a hard coat layer having a thickness of about 3 microns.

The lens element having the hard coat layer and the photochromic cured layer was evaluated for the following items (1) to (4).

The evaluations of the lens element resulted as follows.
Appearance: good
Scratch resistance: A
Adhesiveness of the front side: 100/100
Adhesiveness of the back side: 100/100
Color optical density at the maximum absorption wavelength (588 nm): 1.05
a* value at the time of the color development: 1.20
a* value at the time of the color fading: −1.60
(Refer to Table 5)

The hard coat agent (a) was stored for 3 weeks according to the following item (5). The properties of the hard coat agent (a) were evaluated in the similar manners to those described above. The results after 3 weeks were:
Appearance: good
Scratch resistance: A
Adhesiveness of the front side: 100/100
Adhesiveness of the back side: 100/100
Color optical density at the maximum absorption wavelength (588 nm): 1.03
a* value at the time of the color development: 1.20
a* value at the time of the color fading: −1.60
(Refer to Table 6)
[Evaluation Items]
(1) Appearance
With the coat layer, transparency, coating unevenness, and the like were visually observed. The appearance was evaluated as "good" or "bad".

(2) Scratch Resistance
The lens surface was rubbed with a steel wool (Bonstar #0000, manufactured by NihonSteelWool Co., Ltd.) back and forth ten times at a load of 1 kg, and the degree of scratching was visually evaluated. The criteria of the evaluations were as follows.
A: almost no scratching
B: very slight scratching
C: slight scratching
D: clear scratching
E: the coating layer was peeled off.
(3) Adhesiveness
The adhesiveness between the coat layer and the lens was evaluated by the cross cut tape test in accordance with JISD-0202. Specifically, cut lines at approximately 1 mm intervals were made on the lens surface with a cutter knife to form 100 squares. On the lens surface, a cellophane adhesive tape (Cellotape, registered trade name, manufactured by Nichiban Co., Ltd.) was applied strongly and then peeled off in 90° direction relative to the surface at once, and then the squares wherein the coat layer remained were counted. The evaluation results were expressed by [remaining squares]/100 squares. The adhesiveness evaluated here means the adhesiveness of all the layers laminated on the lens substrate. The evaluations were made on both the front and back sides. With the front side, the adhesiveness of the laminate having the photochromic layer was determined, and with the back side, the adhesiveness between the hard coat layer and the substrate was determined. Usually, the coat layer is not practically useful unless all the squares remain or only a few squares are peeled off.
(4) Color Optical Density and a* Value
In the similar manners to those mentioned above, the color optical density and the a* value were evaluated.
(5) Storage Stability
After the coating composition was prepared, the composition was stored at 20° C. for 3 weeks. Then, coat layers were formed by using the compositions in the similar manner to that described above, and then the appearance, the scratch resistance, the adhesiveness, the color optical density, and the a* value were evaluated.

Examples 2 to 10

In the similar manner to that used to prepare the primer composition (A) in Example 1, primer compositions (B) to (D) were obtained by mixing the components shown in Table 1. In the similar manner to that used to prepare the photochromic composition (I) in Example 1, photochromic compositions (II) to (VII) were obtained by mixing the components shown in Table 2. And, in the similar manner to that used to prepare the hard coat agent (a) in Example 1, hard coat agents (b) to (i) and (1) were obtained by mixing the components shown in Tables 3 and 4. Cured photochromic layers were prepared in the similar manner to that of Example 1 by using the lens substrates, the primer compositions, the photochromic compositions, and the hard coat agents shown in Table 5. The color optical density at the maximum absorption wavelength and the a* values at the time of color development and fading were evaluated. Then, hard coat layers were laminated in the similar manner to that of Example 1. The appearance, the scratch resistance, the adhesiveness, the color optical density at the maximum absorption wavelength, and the a* values at the time of color development and fading were evaluated. The results are summarized in Table 5. The storage stabilities are shown in Table 6.

Comparative Examples 1 and 2

In the similar manner to that used to prepare the hard coat agent (a) in Example 1, hard coat agents (m) and (n) were obtained by mixing the components shown in Table 4. Then, cured photochromic layers were formed in the similar manner to that of Example 1 by using the lens substrates, the primer compositions, and the photochromic compositions shown in Table 5. The color optical density at the maximum absorption wavelength and the a* values at the time of color development and fading were evaluated. Thereafter, hard coat layers were laminated by using the hard coat agents shown in Table 5 in the similar manner to that of Example 1. The appearance, the scratch resistance, the adhesiveness, the color optical density at the maximum absorption wavelength, and the a* values at the time of color development and fading were evaluated. The results are summarized in Table 5. The storage stabilities are shown in Table 6.

Examples 11 to 14

In the similar manner to that used to prepare the hard coat agent (a) in Example 1, hard coat agents (j) and (k) were obtained by mixing the components shown in Table 4. Here, in the preparation of these hard coat agents, 12.9 g of an aqueous solution of 0.05N N-methylammonium chloride (corresponding to the quaternary salt) was added instead of 12.9 g of the aqueous solution of 0.05N hydrochloric acid used in the hard coat agent (a). Then, cured photochromic layers were formed in the similar manner to that of Example 1. The color optical density at the maximum absorption wavelength and the a* values at the time of color development and fading were evaluated. Thereafter, the hard coat layer was laminated in the similar manner to that of Example 1 except that the hard coat agent shown in Table 5 was used and the corona discharge treatment which was the pretreatment process prior to the application of the hard coat agent was not carried out but the etching of the photochromic laminate by immersing the laminate for 10 minutes in the 20% KOH aqueous solution at 50° C. was carried out. The appearance, the scratch resistance, the adhesiveness, the color optical density at the maximum absorption wavelength, and the a* values at the time of color development and fading were evaluated. The results are summarized in Table 5. The storage stabilities are shown in Table 6.

TABLE 1

| Primer No | Commercially available primer (parts by mass) | Diluent solvent (parts by mass) | Leveling agent (parts by mass) |
|---|---|---|---|
| A | Takeseal PFR402TP-450 | Ethyl acetate 50 | FZ-2104 0.03 |
| B | Takeseal PFR402TP-470 | Ethyl acetate 30 | FZ-2104 0.015 |
| C | Takeseal PFR402TP-460 | Ethyl acetate/butyl acetate 20/20 | L-7001 0.03 |
| D | Takeseal PFR402TP-480 | Ethyl acetate 20 | L-7001 0.03 |

TABLE 2

| Composition No. | Radical polymerizable monomers (parts by mass) | Photochromic compounds (parts by mass) | Polymerization initiators (parts by mass) | Stabilizers (parts by mass) | Silane coupling agents (parts by mass) | Leveling agents (parts by mass) | Viscosity at 25° C. (cP) |
|---|---|---|---|---|---|---|---|
| I | BPE/9GDA/TMPT/EB6A/GMA 40/15/25/10/10 | PC1/PC3/PC4 2.0/0.6/0.4 | CGI1800 0.5 | LS765 5 | TSL 7 | SiL1 0.1 | 130 |
| II | BPE Oligo/9GDA/TMPT/EB6A/GMA 40/20/20/10/10 | PC1/PC3 2.1/0.5 | CGI1800 0.4 | LS765 5 | TSL 7 | SiL1 0.1 | 156 |
| III | BPE Oligo/9GDA/TMPT/U6A/GMA 20/40/10/20/10 | PC1/PC3/PC4 2.0/0.6/0.3 | CGI1800 0.4 | LS765 5 | TSL 7 | SiL2 0.15 | 110 |
| IV | BPE/9GDA/TMPT/EB6A/U6A/GMA 30/20/20/10/10/10 | PC1/PC3/PC4 1.7/0.5/0.5 | CGI1870 0.4 | LS765 5 | TSL 7 | SiL1 0.1 | 125 |
| V | BPE Oligo/BPE/9GDA/TMPT/EB6A/GMA 30/20/10/20/15/5 | PC1 2.3 | CGI1800 0.3 | LS765 5 | TSL 7 | SiL1 0.1 | 142 |
| VI | BPE Oligo/9GDA/TMPT/EB6A/GMA 50/10/20/15/5 | PC2/PC3/PC4 2.0/0.6/0.4 | CGI1870 0.3 | LS765 5 | TSL 7 | SiL1 0.1 | 171 |
| VII | BPE Oligo/9GDA/TMPT/EB6A/GMA 45/15/29/10/1 | PC1/PC3/PC4/PC5 1.7/0.3/0.2/1.2 | CGI1870 0.3 | LS765 5 | TSL 7 | SiL1 0.1 | 162 |

TABLE 3

| Hard coat agents | Metal oxide fine particles sol (g) % By mass of metal oxide fine particles based on the standard mass (%) | Methyl triethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| (a) | SOL1 91.7 36 | 21.9 28 | GTS 27.2 36 | None — | MeOH/TBA/AcAc/ EGPE = 37.6/11.8/ 11.8/5.2 | C1 0.7 | 0.05N Aqueous hydrochloric acid 12.9 | L7001 0.1 |

TABLE 3-continued

| Hard coat agents | Metal oxide fine particles sol (g) % By mass of metal oxide fine particles based on the standard mass (%) | Methyl triethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| (b) | SOL1 91.7 38 | 14.6 20 | GTS 31.1 42 | None | MeOH/TBA/AcAc/ EGPE = 41.3/11.8/ 11.8/5.2 | C1 0.7 | 0.05N Aqueous hydrochloric acid 11.6 | L7001 0.1 |
| (c) | SOL1 91.7 34 | 27.8 35 | GTS 24.1 30 | None | MeOH/TBA/AcAc/ EGPE = 33.9/11.8/ 11.8/5.2 | C1 0.7 | 0.05N Aqueous hydrochloric acid 13.9 | L7001 0.1 |
| (d) | SOL1 110 45 | 21.9 30 | GTS/GDS 11.7/7.5 26 | None | TBA/DOX = 28.7/29.8 | C1/C3 0.5/0.5 | 0.05N Aqueous hydrochloric acid 10.5 | L7001 0.1 |
| (e) | SOL1 73.3 36 | 11.7 20 | GTS 12.4 21 | B1 13.8 23 | IPA/TBA/DOX = 33.4/33.4/ 33.3 | C1/C5 0.5/0.5 | 0.05N Aqueous hydrochloric acid 8.8 | L7001 0.1 |
| (f) | SOL2 91.7 36 | 21.9 28 | GTS 27.2 36 | None | MeOH/TBA/AcAc/ EGPE = 37.6/11.8/ 11.8/5.2 | C1 1.5 | 0.05N Aqueous hydrochloric acid 12.9 | L7001 0.1 |
| (g) | SOL2 119.2 52 | 14.6 20 | GTS 19.4 28 | None | TBA/DAA/EGPE/ IPA = 28.3/14.1/ 14.1/14.1 | C1 2.0 | 0.05N Aqueous hydrochloric acid 8.9 | L7001 0.1 |

TABLE 4

| Hard coat agents | Metal oxide fine particles sol (g) % By mass of metal oxide fine particles based on the standard mass (%) | Methyl triethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| (h) | SOL3 106.3 36 | 25.4 29 | GTS 27.1 30 | HTS 4.8 5 | TBA/DAA/EGEE/ IPA = 23.1/11.6/ 11.6/11.6 | C1 1.6 | 0.05N Aqueous hydrochloric acid 15.2 | L7001 0.1 |
| (i) | SOL4 91.7 33 | 29.2 36 | GTS 15.5 19 | BISSI 9.5 12 | TBA/DAA/EGBE/ IPA = 24.5/12.3/ 12.3/12.3 | C1 0.7 | 0.05N Aqueous hydrochloric acid 15.6 | L7001 0.1 |
| (j) | SOL1 91.7 36 | 21.9 28 | GTS 27.2 36 | None | MeOH/TBA/AcAc/ EGPE = 37.6/11.8/ 11.8/5.2 | C1 0.7 | 0.05N Aqueous trimethylammonium chloride 12.9 | L7001 0.1 |
| (k) | SOL2 91.7 36 | 21.9 28 | GTS 27.2 36 | None | MeOH/TBA/AcAc/ PGPE = 37.6/11.8/ 11.8/5.2 | C1 = 1.5 | 0.05N Aqueous trimethylammonium chloride 12.9 | L7001 0.1 |
| (l) | SOL1 91.7 36 | 21.9 29 | ETS 26.8 35 | None | MeOH/TBA/AcAc/ PGPE = 38.3/11.8/ 11.8/5.3 | C1/C2 0.7/0.1 | 0.05N Aqueous hydrochloric acid 12.5 | L7001 0.1 |

TABLE 4-continued

| Hard coat agents | Metal oxide fine particles sol (g) % By mass of metal oxide fine particles based on the standard mass (%) | Methyl triethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| (m) | SOL1 106.3 41 | None | GTS 45.1 59 | None | MeOH/TBA/AcAc/ PGPE = 29.1/11.9/ 11.9/5.3 | C1 0.7 | 0.05N Aqueous hydrochloric acid 10.3 | L7001 0.1 |
| (n) | SOL2 91.7 41 | None | GTS 38.9 59 | None | MeOH/TBA/AcAc/ EGPE = 37.6/11.8/ 11.8/5.2 | C1 1.5 | 0.05N Aqueous hydrochloric acid 8.9 | L7001 0.1 |

TABLE 5

| | | | | | Initial characteristics | | | | | | | | | | |
|---|---|---|---|---|---|---|---|---|---|---|---|---|---|---|---|
| | | | | | Characteristics with photochromic layer alone (without hard coat) | | | | | | Characteristics with photochromic layer plus hard coat layer | | | | |
| | | | | | Photochromic characteristics | | a* | | | | | | Photochromic characteristics | a* | |
| NO. | Lens substrates | Primer compositions | Photo-chromic compositions | Hard coat agents | λ max (nm) | Color optical density | When color developed | When color faded | Appearance | Scratch resistance | Front side adhesiveness | Back side adhesiveness | λ max (nm) | Color optical density | When color developed | When color faded |
| ex. 1 | MRB | A | I | a | 588 | 1.10 | 1.1 | −1.5 | ○ | A | 100 | 100 | 588 | 1.05 | 1.2 | −1.6 |
| ex. 2 | MRB | A | I | b | 588 | 1.05 | 1.0 | −1.5 | ○ | A | 100 | 100 | 588 | 1.03 | 1.2 | −1.5 |
| ex. 3 | MRB | B | I | c | 588 | 1.03 | 1.0 | −1.3 | ○ | B | 100 | 100 | 588 | 1.03 | 1.0 | −1.3 |
| ex. 4 | MRB | B | I | d | 588 | 1.05 | 1.1 | −1.3 | ○ | A | 100 | 100 | 588 | 1.05 | 1.3 | −1.3 |
| ex. 5 | MRB | A | I | e | 588 | 1.05 | 0.8 | −1.2 | ○ | A | 100 | 100 | 588 | 1.05 | 0.9 | −1.2 |
| ex. 6 | MRB | A | I | f | 588 | 1.00 | 0.8 | −1.2 | ○ | B | 100 | 100 | 588 | 1.02 | 1.2 | −0.8 |
| ex. 7 | CR | C | II | g | 592 | 1.00 | 0.8 | −1.2 | ○ | A | 100 | 100 | 592 | 1.05 | 1.3 | −0.8 |
| ex. 8 | TE | C | III | h | 588 | 1.08 | 0.8 | −1.2 | ○ | B | 100 | 100 | 588 | 1.05 | 1.3 | −0.7 |
| ex. 9 | SE | D | IV | i | 588 | 1.03 | 0.9 | −1.3 | ○ | B | 100 | 100 | 588 | 1.04 | 0.9 | −1.3 |
| ex. 10 | MRA | D | IV | l | 588 | 1.06 | 1.0 | −1.3 | ○ | B | 100 | 100 | 588 | 1.06 | 1.1 | −1.3 |
| comp. ex. 1 | MRB | A | I | m | 588 | 1.10 | 1.1 | −1.5 | ○ | C | 100 | 100 | 588 | 1.05 | 2.5 | 0.2 |
| comp. ex. 2 | MRB | A | I | n | 588 | 1.00 | 0.8 | −1.2 | ○ | C | 100 | 100 | 588 | 1.02 | 5.0 | 2.2 |
| ex. 11 | SE | A | I | a | 588 | 1.10 | 1.1 | −1.5 | ○ | A | 100 | 95 | 588 | 1.05 | 1.2 | −1.6 |
| ex. 12 | SE | A | I | j | 588 | 1.10 | 1.1 | −1.5 | ○ | A | 100 | 100 | 588 | 1.05 | 1.2 | −1.6 |
| ex. 13 | SE | A | I | f | 588 | 1.00 | 0.8 | −1.2 | ○ | B | 100 | 95 | 588 | 1.02 | 1.2 | −0.8 |
| ex. 14 | SE | A | I | k | 588 | 1.00 | 0.8 | −1.2 | ○ | A | 100 | 100 | 588 | 1.02 | 1.0 | −1.0 |

TABLE 6

| | | | | | After 3 weeks of storage | | | | | | | | | | |
|---|---|---|---|---|---|---|---|---|---|---|---|---|---|---|---|
| | | | | | Characteristics with photochromic layer alone (without hard coat) | | | | | | Characteristics with photochromic layer plus hard coat layer | | | | |
| | | | | | Photochromic characteristics | | a* | | | | | | Photochromic characteristics | a* | |
| NO. | Lens substrates | Primer compositions | Photo-chromic compositions | Hard coat agents | λ max (nm) | Color optical density | When color developed | When color faded | Appearance | Scratch resistance | Front side adhesiveness | Back side adhesiveness | λ max (nm) | Color optical density | When color developed | When color faded |
| ex. 1 | MRB | A | I | a | 588 | 1.05 | 1.1 | −1.5 | ○ | A | 100 | 100 | 588 | 1.03 | 1.2 | −1.6 |
| ex. 2 | MRB | A | I | b | 588 | 1.05 | 1.0 | −1.5 | ○ | A | 100 | 100 | 588 | 1.03 | 1.2 | −1.5 |
| ex. 3 | MRB | B | I | c | 588 | 1.08 | 1.0 | −1.3 | ○ | B | 100 | 100 | 588 | 1.06 | 1.0 | −1.3 |

TABLE 6-continued

| | | | | | Characteristics with photochromic layer alone (without hard coat) | | | | | | Characteristics with photochromic layer plus hard coat layer | | | | | |
|---|---|---|---|---|---|---|---|---|---|---|---|---|---|---|---|---|
| | | | | | Photochromic characteristics | | a* | | | | | | Photochromic characteristics | | a* | |
| NO. | Lens sub-strates | Primer compo-sitions | Photo-chromic compo-sitions | Hard coat agents | λ max (nm) | Color optical density | When color developed | When color faded | Ap-pear-ance | Scratch resist-ance | Front side adhe-sive-ness | Back side adhe-sive-ness | λ max (nm) | Color optical density | When color developed | When color faded |
| ex. 4 | MRB | B | I | d | 588 | 1.05 | 1.1 | −1.3 | ○ | B | 100 | 100 | 588 | 1.05 | 1.3 | −1.3 |
| ex. 5 | MRB | A | I | e | 588 | 1.10 | 0.8 | −1.2 | ○ | A | 100 | 100 | 588 | 1.08 | 0.9 | −1.2 |
| ex. 6 | MRB | A | I | f | 588 | 1.00 | 0.8 | −1.2 | ○ | B | 100 | 100 | 588 | 1.02 | 1.2 | −0.8 |
| ex. 7 | CR | C | II | g | 592 | 1.00 | 0.8 | −1.2 | ○ | A | 100 | 100 | 588 | 1.05 | 1.3 | −0.8 |
| ex. 8 | TE | C | III | h | 588 | 1.08 | 0.8 | −1.2 | ○ | B | 100 | 100 | 588 | 1.05 | 1.3 | −0.7 |
| ex. 9 | SE | D | IV | i | 588 | 1.03 | 0.9 | −1.3 | ○ | B | 100 | 100 | 588 | 1.04 | 0.9 | −1.3 |
| ex. 10 | MRA | D | IV | l | 588 | 1.06 | 1.0 | −1.3 | ○ | B | 100 | 100 | 588 | 1.06 | 1.1 | −1.3 |
| comp. ex. 1 | MRB | A | I | m | 588 | 1.10 | 1.1 | −1.5 | ○ | D | 100 | 100 | 588 | 1.05 | 3.0 | 0.5 |
| comp. ex. 2 | MRB | A | I | n | 588 | 1.00 | 0.8 | −1.2 | ○ | D | 100 | 100 | 588 | 1.02 | 5.5 | 2.8 |
| ex. 11 | SE | A | I | a | 588 | 1.09 | 1.1 | −1.5 | ○ | A | 100 | 90 | 588 | 1.05 | 1.2 | −1.6 |
| ex. 12 | SE | A | I | j | 588 | 1.08 | 1.1 | −1.5 | ○ | A | 100 | 100 | 588 | 1.05 | 1.2 | −1.6 |
| ex. 13 | SE | A | I | f | 588 | 1.00 | 0.9 | −1.2 | ○ | B | 100 | 90 | 588 | 1.02 | 1.2 | −0.8 |
| ex. 14 | SE | A | I | k | 588 | 1.00 | 0.9 | −1.2 | ○ | A | 100 | 100 | 588 | 1.02 | 1.0 | −1.0 |

As can be seen in the Examples, in the photochromic optical elements of Examples having the hard coat layer formed by using the hard coat agent which contained the specific amount of the methyl trialkoxy silane, the hard coat layer was formed without the change in the prescribed color tone, and the photochromic optical elements were excellent in the appearance, the scratch resistance, and the adhesiveness. In contrast, the photochromic optical elements in the Comparative Examples 1 and 2 which were obtained by using the hard coat agent containing the methyl trialkoxy silane in an amount less than the lower limit specified in the present invention, showed that the difference of the a* values [Δ(a*)] before and after formation of the hard coat layer measured at the time of color development was more than 1.0. The increase of redness due to the formation of the hard coat layer was not prevented in the photochromic optical elements of Comparative Examples.

Lens substrates, primer components, photochromic coat layer components, and hard coat layer components used in the Examples 15 to 27 and the Comparative Examples 3 to 7 are shown below.

1) Lens Substrates

CR (a plastic lens of an allyl resin: refractive index=1.50)

MRA (a plastic lens of a thiourethane-based resin: refractive index=1.60)

MRB (a plastic lens of a thiourethane-based resin: refractive index=1.67)

TE (a plastic lens of a thioepoxy-based resin: refractive index=1.71)

SE (a lens of a methacryl resin and a vinyl resin: refractive index=1.60)

2) Primer Components

Takeseal PFR402TP-4 (a moisture-curable primer, manufactured by Takebayashi Chemical Industry Co., Ltd.)

Takeseal PFR 4 (a moisture-curable primer, manufactured by Takebayashi Chemical Industry Co., Ltd.)

3) Photochromic Coat Layer Components

[Radical Polymerizable Monomers]

TMPT: trimethylolpropane trimethacrylate

U6A: urethane oligomer hexaacrylate (U-6HA, manufactured by Shin-Nakamura Chemical Co., Ltd.)

EB6A: polyester oligomer hexaacrylate (EB1830, manufactured by Daicel-UCB Company, Ltd.)

GMA: glycidyl methacrylate

BPE: 2,2-bis(4-methacryloyloxypentaethoxyphenyl)propane

9GDA: polyethylene glycol diacrylate (average molecular weight of 532)

BPE Oligo:

2,2-bis(4-acryloyloxypolyethyleneglycolphenyl)propane having the average molecular weight of 776

(Di)alkylamino Group-Containing Photochromic Compounds

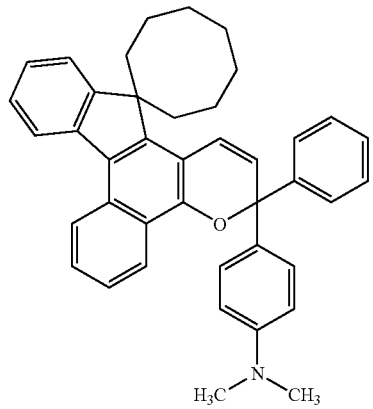

PC11

-continued

PC22

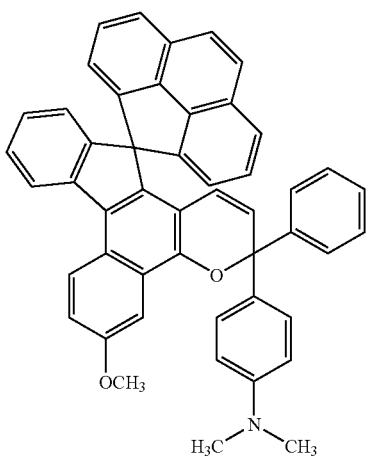

[Photochromic Compounds Other than the (Di)alkylamino Group-Containing Photochromic Compounds]

PC33

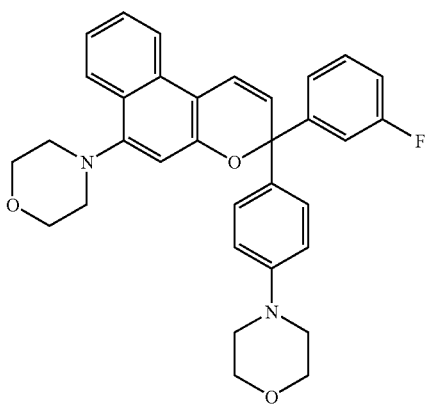

PC44

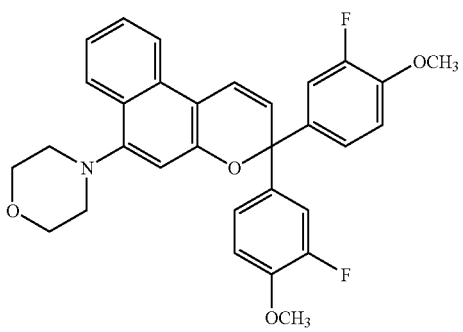

PC55

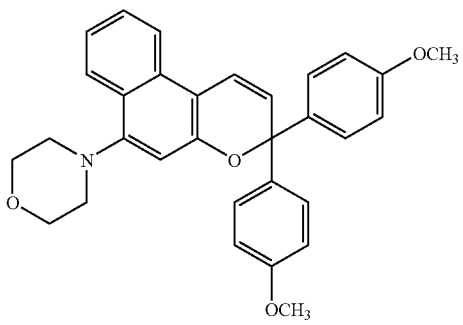

[Photopolymerization Initiators]
CGI 1800: a mixture of 1-hydroxycyclohexyl phenyl ketone and bis(2,6-dimethoxybenzoyl)-2,4,4-trimethyl-pentylphosphine oxide (weight ratio of 3:1)
CGI 1870: a mixture of 1-hydroxycyclohexyl phenyl ketone and bis(2,6-dimethoxybenzoyl)-2,4,4-trimethyl-pentylphosphine oxide (weight ratio of 3:7)
[Stabilizer]
LS765: bis(1, 2,2,6,6-pentamethyl-4-piperidyl) sebacate
[Leveling Agents]
SiL 1: a silicone-type surfactant "L7001" (manufactured by Dow Corning Toray Co., Ltd.)
SiL 2: a silicone-type surfactant "FZ2104" (manufactured by Dow Corning Toray Co., Ltd.)
[Silane Coupling Agent]
TSL: γ-methacryloyloxypropyl trimethoxy silane
4) Hard Coat Layer Components
[Metal Oxide Fine Particles]
SOL 1: a methanol-dispersed silica sol (solid content concentration of 30% by weight, manufactured by Nissan Chemical Industries, Ltd.)
SOL 2: a methanol-dispersed $SnO_2$—$ZrO_2$—$Sb_2O_5$—$SiO_2$ composite metal oxide sol (solid content concentration of 30% by weight, manufactured by Nissan Chemical Industries, Ltd.)
SOL 3: a methanol-dispersed $TiO_2$—$SnO_2$—$ZrO_2$—$Sb_2O_5$ composite metal oxide sol (solid content concentration of 30% by weight, manufactured by Nissan Chemical Industries, Ltd.)
SOL 4: a methanol-dispersed $Sb_2O_5$ metal oxide sol (solid content concentration of 30% by weight, manufactured by Nissan Chemical Industries, Ltd.)
[Tetraalkoxy Silane]
TEOS: tetraethoxy silane
[Epoxy-Containing Silicon Compounds]
GTS: γ-glycidoxypropyl trimethoxy silane
GDS: γ-glycidoxypropyl methyl dimethoxy silane
ETS: β-(3,4-epoxycyclohexyl)ethyl trimethoxy silane
[Other Organosilicon Compounds]
HTS: n-hexyl trimethoxy silane
OTS: n-octyl trimethoxy silane
ODS: n-octyl methyl dimethoxy silane
DTS: n-decyl trimethoxy silane
ODTS: n-octadecyl trimethoxy silane
An organosilicon compound B1

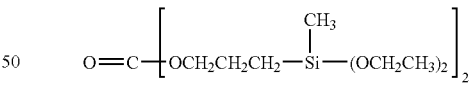

[Organic Solvents]
MeOH: methanol
IPA: isopropanol
TBA: t-butanol
EGPE: ethylene glycol monoisopropyl ether
EGEE: ethylene glycol monoethyl ether
EGBE: ethylene glycol mono-t-butyl ether
PGPE: polyethylene glycol mono-n-propyl ether
AcAc: acetylacetone
DAA: diacetone alcohol
DIO: dioxane
[Curing Catalysts]
C11: tris(2,4-pentanedionato) aluminum (III)
C22: tris(2,4-pentanedionato)iron (III)
C33: (2,4-pentanedionato)sodium C44: ammonium perchlorate
C55: magnesium perchlorate Example 15

1. Preparation of Lens Element Having Cured Photochromic Layer

In the similar manner to that of Example 1, lens substrate having a primer layer was prepared.

Then, approximately 1 g of a photochromic polymerizable composition was applied on the surface of the above-mentioned lens element having the primer layer by spin coating. As the photochromic polymerizable composition, Composition (I') prepared by the following method was used.
Preparation of Composition (I'): Firstly, the Radical Polymerizable Monomers:

2,2-bis(4-methacryloyloxypentaethoxyphenyl)propane/ polyethylene glycol diacrylate (average molecular weight of 532)/trimethylolpropane trimethacrylate/polyester oligomer hexaacrylate (EB-1830, manufactured by Daicel-UCB Company, Ltd.)/glycidyl methacrylate were mixed in a ratio of 40/15/25/10/10 parts by mass. Based on 100 parts by mass of the mixture thus obtained, 2.0 parts by mass of the photochromic compound (PC11) having the structure shown by the following formula:

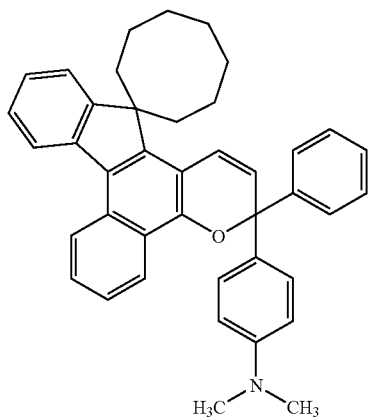 [SMILES: CN(C)c1ccc(C2(c3ccccc3)C=Cc3c4c(c5ccccc5c3O2)-c2ccccc2C42CCCCCCC2)cc1]

0.6 part by mass of the photochromic compound (PC33) having the structure shown by

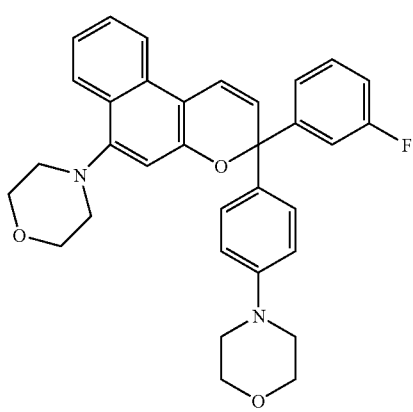 [SMILES: Fc1cccc(C2(c3ccc(N4CCOCC4)cc3)C=Cc3c(cc(N4CCOCC4)c4ccccc34)O2)c1]

and 0.4 part by mass of the photochromic compound (PC44) having the structure shown by

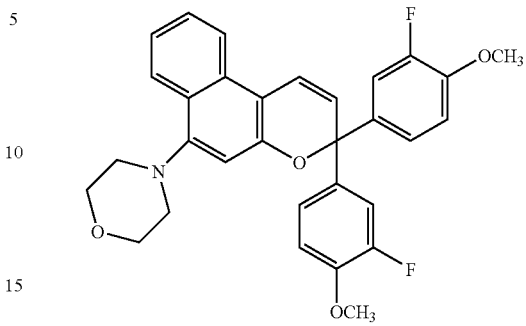

were added, and the mixture was fully mixed. Thereafter, into the composition thus obtained were added 0.5 part by mass of CGI 1800 (a polymerization initiator mixture composed of 1-hydroxycyclohexyl phenyl ketone and bis(2,6-dimethoxybenzoyl)-2,4,4-trimethyl-pentyl phosphine oxide in a weight ratio of 3:1), 5 parts by mass of bis(1,2,2,6,6-pentamethyl-4-piperidyl)sebacate as stabilizer, 7 parts by mass of γ-methacryloyloxypropyl trimethoxy silane as silane coupling agent, and 0.1 part by mass of SiL 1 as leveling agent (L-7001: a silicone-type surfactant, manufactured by Dow Corning Toray Co., Ltd.), and the mixture was fully mixed to give the composition (I') (refer to Table 7). The viscosity of the obtained photochromic polymerizable composition (Composition (I')) at 25° C. was 130 cP.

Under a nitrogen atmosphere, the lens whose surface was coated with the Composition (I') was irradiated with a metal halide lamp whose output at 405 nm was adjusted to 130 mW/cm$^2$ on the lens surface, for 3 minutes and the coated layer was cured. Then, the heat treatment was carried out in an oven controlled at 120° C. and a cured photochromic thin layer was obtained. The thickness of the layer can be controlled by altering the conditions of the spin coating. The thickness of the cured photochromic thin layer was adjusted to 40±1 μm in the present invention.

2. Evaluation of Lens Substrate Having Cured Photochromic Layer

In order to evaluate the photochromic characteristics of the lens substrate having the cured photochromic layer thus obtained, the color optical density was measured in the similar manner to that of Example 1.

The color optical density of the lens element having the photochromic cured layer obtained by the above-mentioned method was 1.05 at the maximum absorption wavelength of 588 nm, and thus the lens element had good photochromic characteristics.

The a* values at the times of color development and fading were measured. The a* values at the times of color development and fading were 1.0 and −1.5, respectively.

3. Formation of Hard Coat Layer

Then, the lens element having the photochromic cured layer was coated with hard coat agent (aa) which was prepared in the following way.
Preparation of hard coat agent (aa): Firstly, 170 g of γ-glycidoxypropyl trimethoxy silane, 100 g of the silicon compound (B1), and 417 g of tetraethoxy silane were mixed. Into this solution was added 200 g of aqueous solution of 0.05N-hydrochloric acid while the solution was thoroughly stirred. The solution was stirred for 5 hours after the completion of the addition. Then, 1.5 g of a silicone-type surfactant (trade name "L-700", manufactured by Nippon Unicar Company Ltd.), 6.0 g of magnesium perchlorate, 540 g of t-butyl alcohol, 590 g of dioxane, and 1000 g of a methanol-dispersed silica sol (solid content concentration of 30% by weight, manufactured by Nissan Chemical Industries, Ltd.) were added and the mixture was stirred for 5 hours, and then aged overnight to give the hard coat agent (aa) of the present invention (refer to Table 8).

Coating of the hard coat agent (aa) was carried out in the following way. Specifically, the lens element having the photochromic cured layer was treated by a corona discharge treatment (both sides) and immersed in 10%-NaOH aqueous solution at 50° C. for 5 minutes. The treated element was dipped in the hard coat agent (aa), and then was lifted at a rate of 30 cm/minute so that the surface of the lens element having the cured photochromic layer with was coated with the agent (aa). After the coating, the lens element was dried at 70° C. for 20 minutes, and allowed to stand at 120° C. for 3 hours so that the agent was cured to form a hard coat layer having a thickness of about 2 microns.

The lens element having the hard coat layer and the photochromic cured layer was evaluated for the items (1) to (4) as described in Example 1.

The evaluations of the lens element resulted as follows;
Appearance: good
Scratch resistance: A
Adhesiveness of the front side: 100/100
Adhesiveness of the back side: 100/100
Color optical density at the maximum absorption wavelength (588 nm): 1.03
$a^*$ value at the time of the color development: 1.2
$a^*$ value at the time of the color fading: −1.3
(Refer to Table 10)

The hard coat agent (aa) was stored for 3 weeks according to the following item (5) of the Example 1. The properties of the hard coat agent (aa) were evaluated in the similar manners to those described above. The results after 3 weeks were:
Appearance: good
Scratch resistance: A
Adhesiveness of the front side: 100/100
Adhesiveness of the back side: 100/100
Color coptical density at the maximum absorption wavelength (586 nm): 1.03
$a^*$ value at the time of the color development: 1.1
$a^*$ value at the time of the color fading: −1.2
(Refer to Table 11)

The hard coat agent (aa) was stored for 5 weeks according to the following item (5) of the Example 1. The properties of the hard coat agent (aa) were evaluated in the similar manners to those described above. The results after 5 weeks were:
Appearance: good
Scratch resistance: A
Adhesiveness of the front side: 100/100
Adhesiveness of the back side: 100/100
Color optical density at the maximum absorption wavelength (588 nm): 1.02
$a^*$ value at the time of the color development: 1.1
$a^*$ value at the time of the color fading: −1.0
(Refer to Table 12)

Examples 16 to 27, and Comparative Examples 3 to 7

In the similar manner to that used to prepare the photochromic composition (I') in Example 15, photochromic compositions (II') to (VII') were obtained by mixing the components shown in Table 7. In the similar manner to that used to prepare the hard coat agent (aa) in Example 15, hard coat agents (bb) to (mm) were obtained by mixing the components shown in Tables 8 and 9. Cured photochromic layers were prepared in the similar manner to that of Example 15 by using the lens substrates, the primer compositions, the photochromic compositions, and the hard coat agents shown in Table 10. The color optical density at the maximum absorption wavelength and the $a^*$ values at the time of color development and fading were evaluated. Then, hard coat layers were laminated in the similar manner to that of Example 15. Then, the appearance, the scratch resistance, the adhesiveness, the color optical density at the maximum absorption wavelength, and the $a^*$ values at the time of color development and fading were evaluated. The results are summarized in Table 10. The storage stabilities are shown in Tables 11 and 12.

As can be seen in the Examples, in the photochromic optical elements of Examples having the hard coat layer formed by using the hard coat agent which contained the specific amount of the tetraalkoxy silane, the hard coat layer was formed without the change in the prescribed color tone, and the photochromic optical elements were excellent in the appearance, the scratch resistance, and the adhesiveness. In contrast, the photochromic optical elements in the Comparative Examples 3 and 4 which were obtained by using the hard coat agent containing the tetraalkoxy silane in an amount less than the lower limit specified in the present invention, showed that the difference of the $a^*$ values [$\Delta(a^*)$] before and after formation of the hard coat layer measured at the time of color development was more than 1.0. The increase of redness due to the formation of the hard coat layer was not prevented in the photochromic optical elements of Comparative Examples.

TABLE 7

| Composition No. | Radical polymerizable monomers (parts by mass) | Photochromic compounds (parts by mass) | Polymerization initiators (parts by mass) | Stabilizers (parts by mass) | Silane coupling agents (parts by mass) | Leveling agents (parts by mass) | Viscosity at 25° C. (cP) |
|---|---|---|---|---|---|---|---|
| I' | BPE/9GDA/TMPT/EB6A/GMA 40/15/25/10/10 | PC11/PC33/PC44 2.0/0.6/0.4 | CGI1800 0.5 | LS765 5 | TSL 7 | SiL1 0.1 | 130 |
| II' | BPE Oligo/9GDA/TMPT/EB6A/GMA 40/20/20/10/10 | PC11/PC33 2.1/0.5 | CGI1800 0.4 | LS765 5 | TSL 7 | SiL1 0.1 | 156 |
| III' | BPE Oligo/9GDA/TMPT/U6A/GMA 20/40/10/20/10 | PC11/PC33/PC44 2.0/0.6/0.3 | CGI1800 0.4 | LS765 5 | TSL 7 | SiL2 0.15 | 110 |
| IV' | BPE/9GDA/TMPT/EB6A/U6A/GMA 30/20/20/10/10/10 | PC11/PC33/PC44 1.7/0.5/0.5 | CGI1870 0.4 | LS765 5 | TSL 7 | SiL1 0.1 | 125 |
| V' | BPE Oligo/BPE/9GDA/TMPT/EB6A/GMA 30/20/10/20/15/5 | PC11 2.3 | CGI1800 0.3 | LS765 5 | TSL 7 | SiL1 0.1 | 142 |

TABLE 7-continued

| Composition No. | Radical polymerizable monomers (parts by mass) | Photochromic compounds (parts by mass) | Polymerization initiators (parts by mass) | Stabilizers (parts by mass) | Silane coupling agents (parts by mass) | Leveling agents (parts by mass) | Viscosity at 25° C. (cP) |
|---|---|---|---|---|---|---|---|
| VI' | BPE Oligo/9GDA/TMPT/EB6A/GMA 50/10/20/15/5 | PC22/PC33/PC44 2.0/0.6/0.4 | CGI1870 0.3 | LS765 5 | TSL 7 | SiL1 0.1 | 171 |
| VII' | BPE Oligo/9GDA/TMPT/EB6A/GMA 45/15/29/10/1 | PC11/PC33/PC44/PC55 1.7/0.3/0.2/1.2 | CGI1870 0.3 | LS765 5 | TSL 7 | SiL1 0.1 | 162 |

TABLE 8

| Hard coat agents | Metal oxide fine particles sol (g) % By mass of metal oxide fine particles based on the standard mass (%) | Tetraethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| aa | SOL1 1000 31 | 417 42 | GTS 170 17 | B1 100 10 | TBA/DIO 540/590 | C55 6 | 0.05N Aqueous hydrochloric acid 200 | L7001 1.5 |
| bb | SOL1 1000 33 | 310 34 | GTS 170 18 | BI 140 15 | TBA/DIO 620/140 | C55 6 | 0.05N Aqueous hydrochloric acid 175 | L7001 1.5 |
| cc | SOL1 1455 42 | — | GTS 300 29 | — | MeOH/TBA/AcAc/EGPE 400/160/160/70 | C11 4.5 | 0.05N Aqueous hydrochloric acid 170 | L7001 2 |
| dd | SOL1 1400 42 | 300 29 | GTS/GDS 150/150 29 | — | MeOH/TBA/AcAc 400/340/245 | C55/C11 5/1 | 0.05N Aqueous hydrochloric acid 160 | L7001 2 |
| ee | SOL1 1250 38 | 320 32 | GTS 150 15 | HTS 150 15 | MeOH/IPA/DAA/EGEE 150/330/300/100 | C44/C22 4/1 | 0.05N Aqueous hydrochloric acid 170 | L7001 1.5 |
| ff | SOL2 1250 38 | 310 31 | GTS 170 17 | B1 140 14 | TBA/DIO 620/140 | C55 6 | 0.05N Aqueous hydrochloric acid 175 | L7001 1.5 |
| gg | SOL3 1250 38 | 310 31 | GTS 170 17 | B1 140 14 | TBA/DIO 620/140 | C55 5 | 0.05N Aqueous hydrochloric acid 175 | L7001 1.5 |

TABLE 9

| Hard coat agents | Metal oxide fine particles sol (g) % By mass of metal oxide fine particles based on the standard mass (%) | Tetraethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| hh | SOL4 1250 42 | 200 23 | GTS 170 19 | B1 140 16 | TBA/DIO 620/140 | C55 6 | 0.05N Aqueous hydrochloric acid 175 | L7001 1.5 |
| ii | SOL1 1000 31 | 417 42 | GTS 170 17 | B1/OTS 80/20 10 | MeOH/TBA/EGBE 450/450/100 | C55 6 | 0.05N Aqueous hydrochloric acid 200 | L7001 1.5 |
| jj | SOL1 1000 | 350 | GTS/ETS 130/50 | ODS/DTS 30/30 | MeOH/TBA/AcAc/EGPE | C55/C33 4.5/0.5 | 0.05N Aqueous hydrochloric acid | L7001 1.5 |

TABLE 9-continued

| Hard coat agents | Metal oxide fine particles sol (g) % By mass of metal oxide fine particles based on the standard mass (%) | Tetraethoxy silane (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| kk | SOL1 1455 34 | 70 39 | GTS 170 20 | B1 240 7 | TBA/DIO 200/500/200/120 875/590 | C55 6 | 0.05N Aqueous hydrochloric acid 166 120 | L7001 1.5 |
| ll | SOL1 1455 47 | — 8 | GTS 615 19 | — 26 | MeOH/TBA/AcAc/ EGPE 400/160/160/70 | C11 4.5 | 0.05N Aqueous hydrochloric acid 140 | L7001 2.0 |
| mm | SOL1 1000 42 | — 0 | GTS 170 58 | B1 280 | TBA/DIO 875/500 | C55 6 | 0.05N Aqueous hydrochloric acid 90 | L7001 1.5 |
|  | 40 | 0 | 23 | 37 |  |  |  |  |

TABLE 10

| | | | | | Initial characteristics | | | | | | | | | | |
|---|---|---|---|---|---|---|---|---|---|---|---|---|---|---|---|
| | | | | | Characteristics with photochromic layer alone (without hard coat) | | | | | | Characteristics with photochromic layer plus hard coat layer | | | | |
| | | | | | Photochromic characteristics | | a* | | | | | | Photochromic characteristics | | a* |
| NO. | Lens substrates | Primer compositions | Photochromic compositions | Hard coat agents | λ max (nm) | Color optical density | When color developed | When color faded | Appearance | Scratch resistance | Front side adhesiveness | Back side adhesiveness | λ max (nm) | Color optical density | When color developed | When color faded |
| ex. 15 | MRB | A | I' | aa | 588 | 1.05 | 1.0 | −1.5 | ○ | A | 100 | 100 | 588 | 1.03 | 1.2 | −1.3 |
| ex. 16 | MRB | A | I' | bb | 588 | 1.03 | 0.8 | −1.3 | ○ | A | 100 | 100 | 588 | 1.03 | 1.2 | −1.1 |
| ex. 17 | MRB | A | I' | cc | 586 | 1.05 | 1.1 | −1.3 | ○ | A | 100 | 100 | 586 | 1.05 | 1.3 | −1.2 |
| ex. 18 | MRB | B | I' | dd | 586 | 1.05 | 0.8 | −1.2 | ○ | B | 100 | 100 | 584 | 1.05 | 1.4 | −1.0 |
| ex. 19 | MRB | A | I' | ee | 588 | 1.03 | 0.8 | −1.5 | ○ | B | 100 | 100 | 588 | 1.03 | 1.3 | −1.1 |
| ex. 20 | MRB | A | I' | ff | 588 | 1.04 | 0.9 | −1.3 | ○ | A | 100 | 100 | 588 | 1.04 | 1.1 | −1.2 |
| ex. 21 | CR | C | I' | gg | 588 | 1.07 | 1.0 | −1.6 | ○ | A | 100 | 100 | 588 | 1.07 | 1.2 | −1.3 |
| ex. 22 | TE | C | II' | hh | 592 | 1.08 | 0.6 | −1.0 | ○ | B | 100 | 100 | 586 | 1.08 | 0.8 | −1.0 |
| ex. 23 | SE | D | III' | ii | 590 | 1.05 | 1.0 | −1.3 | ○ | A | 100 | 100 | 588 | 1.05 | 1.1 | −1.6 |
| ex. 24 | MRA | B | IV' | jj | 590 | 1.00 | 0.9 | −1.2 | ○ | A | 100 | 100 | 586 | 1.08 | 1.2 | −1.5 |
| ex. 25 | MRA | D | V' | aa | 594 | 1.12 | 0.0 | −0.3 | ○ | A | 100 | 100 | 592 | 1.10 | 0.2 | −0.1 |
| ex. 26 | MRB | C | VI' | aa | 588 | 1.07 | 1.3 | −1.4 | ○ | A | 100 | 100 | 588 | 1.07 | 1.5 | −1.6 |
| ex. 27 | TE | A | VII' | bb | 594 | 1.01 | 1.0 | −1.4 | ○ | A | 100 | 100 | 594 | 0.98 | 1.3 | −1.6 |
| comp. ex. 3 | MRB | A | I' | kk | 588 | 1.03 | 1.1 | −1.5 | ○ | C | 100 | | 580 | 1.00 | 2.5 | −0.1 |
| comp. ex. 4 | MRA | B | II' | kk | 594 | 1.06 | 0.5 | −1.2 | ○ | C | 100 | | 588 | 1.02 | 2.7 | 0.3 |
| comp. ex. 5 | TE | C | III' | kk | 588 | 1.02 | 1.0 | −1.2 | ○ | C | 100 | | 582 | 1.00 | 2.7 | 0.2 |
| comp. ex. 6 | SE | A | I' | ll | 588 | 1.02 | 0.7 | −1.2 | ○ | D | 100 | 100 | 584 | 1.01 | 3.5 | 1.5 |
| comp. ex. 7 | CR | D | I' | mm | 590 | 1.09 | 0.9 | −1.3 | ○ | D | 100 | 100 | 584 | 1.03 | 3.1 | 1.0 |

TABLE 11

| | | | | | After 3 weeks of storage ||||||||||||
| | | | | | Characteristics with only photochromic layer alone (without hard coat) |||||| Characteristics with photochromic layer plus hard coat layer ||||||||
| | | | | | | | a* || | | | | | | a* ||
| | | Photo- | | | Photochromic characteristics || | | | Front side | Back side | Photochromic characteristics || | |
| NO. | Lens substrates | Primer compositions | chromic compositions | Hard coat agents | λ max (nm) | Color optical density | When color developed | When color faded | Appearance | Scratch resistance | adhesiveness | adhesiveness | λ max (nm) | Color optical density | When color developed | When color faded |
|---|---|---|---|---|---|---|---|---|---|---|---|---|---|---|---|---|
| ex. 15 | MRB | A | I' | aa | 588 | 1.03 | 0.9 | −1.4 | ○ | A | 100 | 100 | 588 | 1.03 | 1.1 | −1.2 |
| ex. 16 | MRB | A | I' | bb | 586 | 1.05 | 1.0 | −1.3 | ○ | A | 100 | 100 | 588 | 1.02 | 1.2 | −1.0 |
| ex. 17 | MRB | A | I' | cc | 588 | 1.02 | 1.2 | −1.4 | ○ | A | 100 | 100 | 586 | 1.00 | 1.3 | −1.3 |
| ex. 18 | MRB | B | I' | dd | 586 | 1.06 | 1.2 | −1.4 | ○ | B | 100 | 100 | 586 | 1.04 | 1.4 | −1.1 |
| ex. 19 | MRB | A | I' | ee | 588 | 1.06 | 1.0 | −1.3 | ○ | B | 100 | 100 | 588 | 1.03 | 1.2 | −0.9 |
| ex. 20 | MRB | A | I' | ff | 588 | 1.03 | 0.8 | −1.4 | ○ | A | 100 | 100 | 588 | 1.00 | 1.0 | −1.1 |
| ex. 21 | CR | C | I' | gg | 588 | 1.05 | 1.1 | −1.5 | ○ | A | 100 | 100 | 588 | 1.04 | 1.2 | −1.2 |
| ex. 22 | TE | C | II' | hh | 592 | 1.07 | 0.5 | −1.0 | ○ | B | 100 | 100 | 586 | 1.04 | 0.8 | −0.8 |
| ex. 23 | SE | D | III' | ii | 592 | 1.08 | 1.1 | −1.5 | ○ | A | 100 | 100 | 588 | 1.07 | 1.2 | −1.4 |
| ex. 24 | MRA | B | IV' | jj | 590 | 1.00 | 0.8 | −1.1 | ○ | A | 100 | 100 | 588 | 0.97 | 1.2 | −1.0 |
| ex. 25 | MRA | D | V' | aa | 596 | 1.12 | 0.0 | −0.2 | ○ | A | 100 | 100 | 592 | 1.08 | 0.2 | −0.1 |
| ex. 26 | MRB | C | VI' | aa | 588 | 1.05 | 1.2 | −1.6 | ○ | A | 100 | 100 | 586 | 1.06 | 1.5 | −1.4 |
| ex. 27 | TE | A | VII' | bb | 594 | 1.01 | 1.1 | −1.5 | ○ | A | 100 | 100 | 592 | 1.00 | 1.2 | −1.3 |
| comp. ex. 3 | MRB | A | I' | kk | 588 | 1.05 | 1.1 | −1.3 | ○ | C | 100 | | 582 | 1.00 | 2.7 | 0.0 |
| comp. ex. 4 | MRA | B | II' | kk | 594 | 1.05 | 0.6 | −1.2 | ○ | C | 100 | | 586 | 1.02 | 2.5 | 0.2 |
| comp. ex. 5 | TE | C | III' | kk | 586 | 1.03 | 1.0 | −1.2 | ○ | D | 100 | | 580 | 1.02 | 2.9 | 0.4 |
| comp. ex. 6 | SE | A | I' | ll | 588 | 1.02 | 0.9 | −1.3 | ○ | D | 100 | 100 | 580 | 1.01 | 3.7 | 1.4 |
| comp. ex. 7 | CR | D | I' | mm | 590 | 1.04 | 1.1 | −1.3 | ○ | D | 100 | 100 | 582 | 1.03 | 3.5 | 1.2 |

TABLE 12

| | | | | | After 5 weeks of storage ||||||||||||
| | | | | | Characteristics with photochromic layer alone (without hard coat) |||||| Characteristics with photochromic layer plus hard coat layer ||||||||
| | | | | | | | a* || | | | | | | a* ||
| | | Photo- | | | Photochromic characteristics || | | | Front side | Back side | Photochromic characteristics || | |
| NO. | Lens substrates | Primer compositions | chromic compositions | Hard coat agents | λ max (nm) | Color optical density | When color developed | When color faded | Appearance | Scratch resistance | adhesiveness | adhesiveness | λ max (nm) | Color optical density | When color developed | When color faded |
|---|---|---|---|---|---|---|---|---|---|---|---|---|---|---|---|---|
| ex. 15 | MRB | A | I' | aa | 588 | 1.05 | 1.0 | −1.3 | ○ | A | 100 | 100 | 588 | 1.02 | 1.1 | −1.0 |
| ex. 16 | MRB | A | I' | bb | 586 | 1.05 | 1.1 | −1.4 | ○ | A | 100 | 100 | 588 | 1.03 | 1.3 | −1.1 |
| ex. 17 | MRB | A | I' | cc | 588 | 1.03 | 1.1 | −1.5 | ○ | A | 100 | 100 | 586 | 1.00 | 1.4 | −1.2 |
| ex. 18 | MRB | B | I' | dd | 588 | 1.05 | 1.3 | −1.5 | ○ | B | 100 | 100 | 588 | 1.03 | 1.4 | −1.1 |
| ex. 19 | MRB | A | I' | ee | 586 | 1.04 | 1.2 | −1.4 | ○ | B | 100 | 100 | 588 | 1.03 | 1.4 | −0.9 |
| ex. 20 | MRB | A | I' | ff | 586 | 1.01 | 1.1 | −1.3 | ○ | A | 100 | 100 | 586 | 1.02 | 1.3 | −1.0 |
| ex. 21 | CR | C | I' | gg | 588 | 1.03 | 1.3 | −1.5 | ○ | A | 100 | 100 | 588 | 1.04 | 1.5 | −1.2 |
| ex. 22 | TE | C | II' | hh | 590 | 1.09 | 0.4 | −1.1 | ○ | B | 100 | 100 | 588 | 1.06 | 0.7 | −0.8 |
| ex. 23 | SE | D | III' | ii | 592 | 1.10 | 1.2 | −1.4 | ○ | A | 100 | 100 | 588 | 1.07 | 1.4 | −1.2 |
| ex. 24 | MRA | B | IV' | jj | 590 | 1.02 | 1.0 | −1.2 | ○ | A | 100 | 100 | 588 | 1.00 | 1.2 | −1.0 |
| ex. 25 | MRA | D | V' | aa | 594 | 1.11 | 0.0 | −0.2 | ○ | A | 100 | 100 | 592 | 1.10 | 0.2 | −0.1 |
| ex. 26 | MRB | C | VI' | aa | 588 | 1.03 | 1.4 | −1.7 | ○ | A | 100 | 100 | 588 | 1.02 | 1.7 | −1.4 |
| ex. 27 | TE | A | VII' | bb | 594 | 1.05 | 1.0 | −1.3 | ○ | A | 100 | 100 | 592 | 1.03 | 1.3 | −1.1 |
| comp. ex. 3 | MRB | A | I' | kk | 588 | 1.06 | 1.1 | −1.4 | ○ | C | 100 | | 582 | 1.05 | 2.6 | 0.3 |
| comp. ex. 4 | MRA | B | II' | kk | 592 | 1.03 | 0.4 | −1.4 | ○ | C | 100 | | 586 | 1.03 | 2.2 | 0.1 |
| comp. ex. 5 | TE | C | III' | kk | 586 | 1.03 | 1.0 | −1.3 | ○ | D | 100 | | 580 | 1.02 | 2.8 | 0.0 |
| comp. ex. 6 | SE | A | I' | ll | 588 | 1.00 | 1.1 | −1.4 | ○ | D | 100 | 100 | 580 | 1.01 | 3.5 | 1.1 |
| comp. ex. 7 | CR | D | I' | mm | 586 | 1.05 | 1.1 | −1.3 | ○ | D | 100 | 100 | 582 | 1.02 | 3.5 | 1.3 |

Examples 28 to 30, and Comparative Examples 8 and 9

Cured photochromic layers were prepared in the similar manner to that of Example 1 by using the lens substrates, the primer compositions, and the photochromic compositions shown in Table 14, and then the color optical density at the maximum absorption wavelength and the a* values at the time of color development and fading were evaluated. Thereafter, hard coat layers were laminated in the similar manner to that of Example 1 by using the hard coat agents shown in Table 13. The appearance, the scratch resistance, the adhesiveness, the color optical density at the maximum absorption wavelength, and the a* values at the time of color development and fading were evaluated. The results are summarized in Table 14. The storage stabilities are shown in Table 15.

TABLE 13

| Hard coat agents | Metal oxide fine particles sol (g) % By mass of metal oxide fine particles based on the standard mass (%) | Specific silane compounds (g) % By mass based on the standard mass (%) | Epoxy-containing silicon compounds (g) % By mass based on the standard mass (%) | Other organosilicon compounds (g) % By mass based on the standard mass (%) | Organic solvents (g) | Curing catalysts (g) | Aqueous solutions used for hydrolysis of organic silane compounds (g) | Surfactants (g) |
|---|---|---|---|---|---|---|---|---|
| (o) | SOL1 104.2 50 | Methyl triethoxy silane 24.9 15 | GTS 30.9 35 | — | MeOH/TBA/AcAc/EGPE = 42/13.3/13.3/5.9 | C1 0.75 | 0.05N Aqueous hydrochloric acid 14.6 | L7001 0.13 |
| (p) | SOL1 104.2 50 | Methyl triethoxy silane 8.3 Tetraethoxy silane 10.8 10 | GTS 35.3 40 | — | MeOH/TBA/AcAc/EGPE = 42/13.3/13.3/5.9 | C1 0.75 | 0.05N Aqueous hydrochloric acid 14.4 | L7001 0.13 |
| (q) | SOL2 119.2 55 | Methyl triethoxy silane 7.8 Tetraethoxy silane 20.3 13.5 | GTS 28.9 31.5 | — | MeOH/TBA/DAA/EGPE/IPA = 5.3/21/10.5/10.5/10.5 | C1 2.3 | 0.05N Aqueous hydrochloric acid 16 | L7001 0.13 |
| (r) | SOL1 115 60 | — | GTS 24.4 30 | B19 10 | TBA/DIO = 47.3/47.3 | C4 0.18 | 0.05N Aqueous hydrochloric acid 9.5 | L7001 0.125 |
| (s) | SOL2 125 55 | — | GTS 44.2 45 | — | TBA/DAA/EGPE/IPA = 33.3/16.7/16.7/3.8 | C1 0.5 | 0.05N Aqueous hydrochloric acid 10.1 | L7001 0.13 |

TABLE 14

| | | | | | Initial characteristics | | | | | | | | | | | |
|---|---|---|---|---|---|---|---|---|---|---|---|---|---|---|---|---|
| | | | | | Characteristics with only photochromic layer alone (without hard coat) | | | | | | Characteristics with photochromic layer plus hard coat layer | | | | | |
| | | | Photo- | | Photochromic characteristics | | a* | | | | Front side | Back side | Photochromic characteristics | | a* | |
| NO. | Lens sub-strates | Primer compo-sitions | chromic compo-sitions | Hard coat agents | λ max (nm) | Color optical density | When color developed | When color faded | Ap-pear-ance | Scratch resist-ance | adhe-sive-ness | adhe-sive-ness | λ max (nm) | Color optical density | When color developed | When color faded |
| ex. 28 | MRB | A | VII | o | 590 | 1.00 | 1.0 | −1.6 | ○ | A | 100 | 100 | 588 | 1.01 | 1.3 | −1.4 |
| ex. 29 | MRB | A | VII | p | 590 | 1.05 | 1.0 | −1.6 | ○ | A | 100 | 100 | 588 | 0.99 | 1.2 | −1.3 |
| ex. 30 | MRB | A | VII | q | 590 | 1.03 | 1.0 | −1.5 | ○ | A | 100 | 100 | 588 | 1.00 | 1.2 | −1.3 |
| comp. ex. 8 | MRB | A | VII | r | 588 | 1.05 | 1.1 | −1.5 | ○ | E | 100 | 100 | 580 | 0.88 | 5.5 | 2.3 |
| comp. ex. 9 | MRB | A | VII | s | 590 | 1.01 | 0.8 | −1.2 | ○ | D | 100 | 100 | 582 | 0.89 | 4.0 | 1.2 |

TABLE 15

| | | | | | Characteristics with photochromic layer alone (without hard coat) | | | | | | Characteristics with photochromic layer plus hard coat layer | | | | | |
| | | | | | Photochromic characteristics | | a* | | | | | | Photochromic characteristics | | a* | |
| NO. | Lens sub-strates | Primer compo-sitions | Photo-chromic compo-sitions | Hard coat agents | λ max (nm) | Color optical density | When color developed | When color faded | Ap-pear-ance | Scratch resist-ance | Front side adhe-sive-ness | Back side adhe-sive-ness | λ max (nm) | Color optical density | When color developed | When color faded |
|---|---|---|---|---|---|---|---|---|---|---|---|---|---|---|---|---|
| example 28 | MRB | A | VII | o | 590 | 1.01 | 1.0 | −1.6 | ○ | A | 100 | 100 | 588 | 1.03 | 1.3 | −1.1 |
| example 29 | MRB | A | VII | p | 590 | 1.02 | 1.0 | −1.6 | ○ | A | 100 | 100 | 588 | 1.01 | 1.2 | −1.2 |
| example 30 | MRB | A | VII | q | 590 | 0.99 | 1.0 | −1.5 | ○ | A | 100 | 100 | 588 | 0.99 | 1.1 | −1.0 |
| comparative example 8 | MRB | A | VII | r | 588 | 1.03 | 1.2 | −1.4 | ○ | E | 100 | 100 | 582 | 0.88 | 6.1 | 3.8 |
| comparative example 9 | MRB | A | VII | s | 590 | 1.01 | 0.8 | −1.3 | ○ | D | 100 | 100 | 580 | 0.89 | 4.4 | 1.5 |

INDUSTRIAL APPLICABILITY

According to the photochromic optical elements of the present invention, the redness does not occur or is reduced at the time of color fading, even after the hard coat layer is formed on the photochromic coat layer containing the (di) alkylamino group-containing photochromic compound in a high concentration. Therefore, the invention contributes to improvement of the commercial value of the photochromic optical elements.

The invention claimed is:

1. A photochromic optical element consisting of:
   an optical substrate,
   a photochromic coat layer, and
   a hard coat layer,
   that are laminated in this order,
   wherein
   (I) the photochromic coat layer is formed from a cured product which is obtained by coating the optical substrate with a photochromic coating agent comprising a polymerizable monomer and a photochromic compound, followed by curing the photochromic coating agent, and
   the cured product comprising as the photochromic compound, an alkylamino group-containing photochromic compound and/or a dialkylamino group-containing photochromic compound in a total amount of 0.1 to 10.0% by mass of the photochromic coat layer,
   wherein (II) the hard coat layer is formed from a cured product which is obtained by coating the photochromic coat layer with a hard coat agent comprising metal oxide particles having an average diameter of 1-300 nm and an organosilicone compound, followed by curing the hard coat agent,
   the hard coat agent at least containing as the organosilicone compound at least one component (A) selected from the group consisting of a tetraalkoxy silane, a methyl trialkoxy silane, and partial hydrolysates thereof, and a component (B) consisting of an epoxy group containing silicone compound and/or partial hydrolysates thereof,
   the hard coat agent containing the metal oxide particles, the component (A) and the component (B) in a total amount of 45 to 100% by mass,
   the hard coat agent containing the metal oxide particles in an amount of 20 to 70% by mass, the component (A) in an amount of 10 to 50% by mass, and the component (B) in an amount of 15 to 60% by mass,
   based on the total mass of the metal oxide particles and the organosilicone compound with the proviso that, when the organosilicone compound is a partial hydrolysate of a partially hydrolyzable organosilicone compound, the mass of the organosilicone compound in the above total mass is the mass of the partially hydrolyzable organosilicone compound.

2. The photochromic optical element according to claim 1, wherein the hard coat agent further comprises a curing catalyst.

3. The photochromic optical element according to claim 2, wherein the hard coat agent for the hard coat layer contains an acetylacetonate complex as the curing catalyst.

4. The photochromic optical element according to claim 3, wherein the hard coat agent for the hard coat layer further comprises a quaternary ammonium salt and/or a quaternary phosphonium salt.

5. The photochromic optical element according to claim 1, wherein the photochromic coat layer has a thickness of 5 to 100 μm.

6. The photochromic optical element according to claim 1, wherein the photochromic coat layer comprises the alkylamino group-containing photochromic compound and/or the dialkylamino group-containing photochromic compound in a total amount of 0.2 to 5.0% by mass, and the photochromic coat layer has a thickness of 20 to 50 μm.

7. The photochromic optical element according to claim 1, wherein the photochromic coat layer comprises the alkylamino group-containing photochromic compound and/or the dialkylamino group-containing photochromic compound in a total amount of 0.3 to 3.0% by mass, and the photochromic coat layer has a thickness of 30 to 40 μm.

8. A method for producing a photochromic optical element of claim 1, comprising the steps of;
forming, on the optical substrate, a photochromic coat layer formed from a cured product which is obtained by coating the optical substrate with a photochromic coating agent comprising a polymerizable monomer and a photochromic compound, followed by curing the photochromic coating agent, the cured product comprising as the photochromic coat compound, an alkylamino group-containing photochromic compound and/or a dialkylamino group-containing photochromic compound in a total amount of 0.1 to 10.0% by mass,
applying a hard coat agent comprising metal oxide particles having an average diameter of 1-300 nm and an organosilicone compound on the photochromic coat layer, and
curing the hard coat agent to form the hard coat layer,
wherein the hard coat agent at least contains as the organosilicone compound at least one component (A) selected from the group consisting of a tetraalkoxy silane, a methyl trialkoxy silane, and partial hydrolysates thereof, and a component (B) consisting of an epoxy group containing silicone component and/or partial hydrolysates thereof,
the hard coat agent containing the metal oxide particles, the component (A) and the component (B) in a total amount of 45 to 100% by mass,
the hard coat agent containing the metal oxide particles in an amount of 20 to 70% by mass, the component (A) in an amount of 10 to 50% by mass, and the component (B) in an amount of 15 to 60% by mass,
based on the total mass of the metal oxide particles and the organosilicone compound with the proviso that when the organosilicone compound is a partial hydrolysate of a partially hydrolyzable organosilicone compound, the mass of the organosilicone compound in the above total mass is the mass of the partially hydrolyzable organosilicone compound.

9. A photochromic optical element consisting of:
an optical substrate,
a photochromic coat layer,
a hard coat layer, and
an antireflection layer,
that are laminated in this order,
wherein (I) the photochromic coat layer is formed from a cured product which is obtained by coating the optical substrate with a photochromic coating agent comprising a polymerizable monomer and a photochromic compound, followed by curing the photochromic coating agent, and
the cured product comprising as the photochromic compound, an alkylamino group-containing photochromic compound and/or a dialkylamino group-containing photochromic compound in a total amount of 0.1 to 10.0% by mass of the photochromic coat layer,
wherein (II) the hard coat layer is formed from a cured product which is obtained by coating the photochromic coat layer with a hard coat agent comprising metal oxide particles having an average diameter of 1-300 nm and an organosilicone compound, followed by curing the hard coat agent,
the hard coat agent at least containing as the organosilicone compound at least one component (A) selected from the group consisting of a tetraalkoxy silane, a methyl trialkoxy silane, and partial hydrolysates thereof, and a component (B) consisting of an epoxy group containing silicone compound and/or partial hydrolysates thereof,
the hard coat agent containing the metal oxide particles, the component (A) and the component (B) in a total amount of 45 to 100% by mass,
the hard coat agent containing the metal oxide particles in an amount of 20 to 70% by mass, the component (A) in an amount of 10 to 50% by mass, and the component (B) in an amount of 15 to 60% by mass,
based on the total mass of the metal oxide particles and the organosilicone compound with the proviso that, when the organosilicone compound is a partial hydrolysate of a partially hydrolyzable organosilicone compound, the mass of the organosilicone compound in the above total mass is the mass of the partially hydrolyzable organosilicone compound,
wherein (III) the antireflection layer comprises a laminate of plural inorganic film layers having different refractive indexes.

10. A method for producing a photochromic optical element of claim 9 comprising the steps of:
forming, on the optical substrate, a photochromic coat layer formed from a cured product which is obtained by coating the optical substrate with a photochromic coating agent comprising a polymerizable monomer and a photochromic compound, followed by curing the photochromic coating agent, the cured product comprising as the photochromic coat compound, an alkylamino group-containing photochromic compound and/or a dialkylamino group-containing photochromic compound in a total amount of 0.1 to 10.0% by mass,
applying a hard coat agent comprising metal oxide particles having an average diameter of 1-300 nm and an organosilicone compound on the photochromic coat layer, and
curing the hard coat agent to form the hard coat layer, and
applying an antireflection layer on the hard coat layer, wherein the antireflection layer is a laminate of plural inorganic film layers having different refractive indexes;
wherein the hard coat agent at least contains as the organosilicone compound at least one component (A) selected from the group consisting of a tetraalkoxy silane, a methyl trialkoxy silane, and partial hydrolysates thereof, and a component (B) consisting of an epoxy group containing silicone component and/or partial hydrolysates thereof,
the hard coat agent containing the metal oxide particles, the component (A) and the component (B) in a total amount of 45 to 100% by mass,
the hard coat agent containing the metal oxide particles in an amount of 20 to 70% by mass, the component (A) in an amount of 10 to 50% by mass, and the component (B) in an amount of 15 to 60% by mass,
based on the total mass of the metal oxide particles and the organosilicone compound with the proviso that when the organosilicone compound is a partial hydrolysate of a partially hydrolyzable organosilicone compound, the mass of the organosilicone compound in the above total mass is the mass of the partially hydrolyzable organosilicone compound.

11. A photochromic optical element consisting of:
an optical substrate,
a primer layer,
a photochromic coat layer,
a hard coat layer, and
an antireflection layer,
that are laminated in this order,
wherein (I) the primer layer is an urethane based primer resin layer, wherein (II) the photochromic coat layer is formed from a cured product which is obtained by coating the optical substrate with a photochromic coating agent comprising a polymerizable monomer and a photochromic compound, followed by curing the photochromic coating agent, and the cured product comprising as the photochromic compound, an alkylamino group-containing photochromic compound and/or a dialkylamino group-containing photochromic compound in a total amount of 0.1 to 10.0% by mass of the photochromic coat layer, wherein (III) the hard coat layer is formed from a cured product which is obtained by coating the photochromic coat layer with a hard coat agent comprising metal oxide particles having an average diameter of 1-300 nm and an organosilicone compound, followed by curing the hard coat agent, the hard coat agent at least containing as the organosilicone compound at least one component (A) selected from the group consisting of a tetraalkoxy silane, a methyl trialkoxy silane, and partial hydrolysates thereof, and a component (B) consisting of an epoxy group containing silicone compound and/or partial hydrolysates thereof, the hard coat agent containing the metal oxide particles, the component (A) and the component (B) in a total amount of 45 to 100% by mass, the hard coat agent containing the metal oxide particles in an amount of 20 to 70% by mass, the component (A) in an amount of 10 to 50% by mass, and the component (B) in an amount of 15 to 60% by mass, based on the total mass of the metal oxide particles and the organosilicone compound with the proviso that, when the organosilicone compound is a partial hydrolysate of a partially hydrolyzable organosilicone compound, the mass of the organosilicone compound in the above total mass is the mass of the partially hydrolyzable organosilicone compound, and wherein (IV) the antireflection layer comprises a laminate of plural inorganic film layers having different refractive indexes.

12. A method for producing a photochromic optical element of claim 11, comprising the steps of;

forming, on the optical substrate, a primer layer, forming, on the primer layer, a photochromic coat layer formed from a cured product which is obtained by coating the optical substrate with a photochromic coating agent comprising a polymerizable monomer and a photochromic compound, followed by curing the photochromic coating agent, the cured product comprising as the photochromic coat compound, an alkylamino group-containing photochromic compound and/or a dialkylamino group-containing photochromic compound in a total amount of 0.1 to 10.0% by mass, applying a hard coat agent comprising metal oxide particles having an average diameter of 1-300 nm and an organosilicone compound on the photochromic coat layer, and curing the hard coat agent to form the hard coat layer, and applying an antireflection layer on the hard coat layer, wherein the antireflection layer is a laminate of plural inorganic film layers having different refractive indexes;

wherein the hard coat agent at least contains as the organosilicone compound at least one component (A) selected from the group consisting of a tetraalkoxy silane, a methyl trialkoxy silane, and partial hydrolysates thereof, and a component (B) consisting of an epoxy group containing silicone component and/or partial hydrolysates thereof, the hard coat agent containing the metal oxide particles, the component (A) and the component (B) in a total amount of 45 to 100% by mass, the hard coat agent containing the metal oxide particles in an amount of 20 to 70% by mass, the component (A) in an amount of 10 to 50% by mass, and the component (B) in an amount of 15 to 60% by mass, based on the total mass of the metal oxide particles and the organosilicone compound with the proviso that when the organosilicone compound is a partial hydrolysate of a partially hydrolyzable organosilicone compound, the mass of the organosilicone compound in the above total mass is the mass of the partially hydrolyzable organosilicone compound.

13. A photochromic optical element consisting of:

an optical substrate, a primer layer, a photochromic coat layer, and a hard coat layer, that are laminated in this order, wherein (I) the primer layer is an urethane based primer resin layer, wherein (II) the photochromic coat layer is formed from a cured product which is obtained by coating the optical substrate with a photochromic coating agent comprising a polymerizable monomer and a photochromic compound, followed by curing the photochromic coating agent, and the cured product comprising as the photochromic compound, an alkylamino group-containing photochromic compound and/or a dialkylamino group-containing photochromic compound in a total amount of 0.1 to 10.0% by mass of the photochromic coat layer, and wherein (III) the hard coat layer is formed from a cured product which is obtained by coating the photochromic coat layer with a hard coat agent comprising metal oxide particles having an average diameter of 1-300 nm and an organosilicone compound, followed by curing the hard coat agent, the hard coat agent at least containing as the organosilicone compound at least one component (A) selected from the group consisting of a tetraalkoxy silane, a methyl trialkoxy silane, and partial hydrolysates thereof, and a component (B) consisting of an epoxy group containing silicone compound and/or partial hydrolysates thereof, the hard coat agent containing the metal oxide particles, the component (A) and the component (B) in a total amount of 45 to 100% by mass, the hard coat agent containing the metal oxide particles in an amount of 20 to 70% by mass, the component (A) in an amount of 10 to 50% by mass, and the component (B) in an amount of 15 to 60% by mass, based on the total mass of the metal oxide particles and the organosilicone compound with the proviso that, when the organosilicone compound is a partial hydrolysate of a partially hydrolyzable organosilicone compound, the mass of the organosilicone compound in the above total mass is the mass of the partially hydrolyzable organosilicone compound.

14. A method of producing a photochromic optical element of claim 13, comprising the steps of:

forming, on the optical substrate, a primer layer, forming, on the primer layer, a photochromic coat layer formed from a cured product which is obtained by coating the optical substrate with a photochromic coating agent comprising a polymerizable monomer and a photochromic compound, followed by curing the photochromic coating agent, the cured product comprising as the photochromic coat compound, an alkylamino group-containing photochromic compound and/or a dialkylamino group-containing photochromic compound in a total amount of 0.1 to 10.0% by mass, applying a hard coat agent comprising metal oxide particles having an average diameter of 1-300 nm and an organosilicone compound on the photochromic coat layer, and curing the hard coat agent to form the hard coat layer, wherein the hard coat agent at least contains as the organosilicone compound at least one component (A) selected from the group consisting of a tetraalkoxy silane, a methyl trialkoxy silane, and partial hydrolysates thereof, and a component (B) consisting of an epoxy group containing silicone component and/or partial hydrolysates thereof, the hard coat agent containing the metal oxide particles, the component (A) and the component (B) in a total amount of 45 to 100% by mass, the hard coat agent containing the metal oxide particles in an amount of 20 to 70% by mass, the component (A) in an amount of 10 to 50% by mass, and the component (B) in an amount of 15 to 60% by mass, based on the total mass of the metal oxide particles and the organosilicone compound with the proviso that when the organosilicone compound is a partial hydrolysate of a partially hydrolyzable organosilicone compound, the mass of the organosilicone compound in the above total mass is the mass of the partially hydrolyzable organosilicone compound.

* * * * *